United States Patent [19]

Sato

[11] Patent Number: 5,754,745
[45] Date of Patent: May 19, 1998

[54] COMPOSITE FACSIMILE APPARATUS HAVING FUNCTION FOR ACHIEVING EFFICIENT USE OF LIMITED RESOURCES

[75] Inventor: Kazuhiro Sato, Hiratsuka, Japan

[73] Assignee: Ricoh Company, Ltd., Tokyo, Japan

[21] Appl. No.: 734,260

[22] Filed: Oct. 21, 1996

Related U.S. Application Data

[62] Division of Ser. No. 208,294, Mar. 10, 1994, Pat. No. 5,644,405.

[30]  Foreign Application Priority Data

Mar. 11, 1993 [JP] Japan ................. 5-49790
Oct. 21, 1993 [JP] Japan ................. 5-263207

[51] Int. Cl.$^6$ ............................. H04N 1/32
[52] U.S. Cl. ............. 395/113; 358/404; 358/436; 358/442; 358/468; 358/437; 395/115
[58] Field of Search ................. 358/434–436, 358/438, 442, 468, 437; 395/113–115; H04N 1/32

[56]  References Cited

U.S. PATENT DOCUMENTS

| | | | |
|---|---|---|---|
| 4,727,435 | 2/1988 | Otani et al. | 358/468 |
| 4,907,094 | 3/1990 | Mishima et al. | 358/437 |
| 4,970,599 | 11/1990 | Nobuta | 358/437 |
| 5,081,539 | 1/1992 | Kaneko | 358/437 |
| 5,200,830 | 4/1993 | Imaizumi et al. | 358/468 |
| 5,283,665 | 2/1994 | Ogata | 358/434 |
| 5,337,156 | 8/1994 | Nakamura et al. | 358/404 |
| 5,373,349 | 12/1994 | Ito | 358/434 |
| 5,592,307 | 1/1997 | Murai | 358/468 |
| 5,608,540 | 3/1997 | Ogawa | 358/434 |
| 5,644,405 | 7/1997 | Sato | 358/437 |

FOREIGN PATENT DOCUMENTS

| | | |
|---|---|---|
| 62-209972 | 9/1987 | Japan. |
| 62-281569 | 12/1987 | Japan. |
| 1-292966 | 11/1989 | Japan. |
| 2-65559 | 3/1990 | Japan. |
| 2-235076 | 9/1990 | Japan. |
| 4-13368 | 1/1992 | Japan. |
| 4-8056 | 1/1992 | Japan. |
| 4-134965 | 5/1992 | Japan. |
| 4-159848 | 6/1992 | Japan. |
| 4-276767 | 10/1992 | Japan. |
| 4-315368 | 11/1992 | Japan. |
| 4-335661 | 11/1992 | Japan. |

*Primary Examiner*—Kim Vu
*Attorney, Agent, or Firm*—Oblon, Spivak, McClelland, Maier & Neustadt, P.C.

[57]  ABSTRACT

A signal receiving unit receives an image signal through the facsimile function. An image reading unit reads an image and outputs the corresponding image signal. An outputting unit outputs onto a recording medium either the image specified by the signal received by the signal receiving unit or the image specified by the signal output by the image reading unit. A storing unit stores the signal input by the signal receiving unit if appropriate. A switching unit switches so that the outputting unit starts outputting of the image specified by the signal output by the image reading unit when the image reading unit starts reading of the image even if the outputting unit is outputting the image specified by the signal receiving unit, the storing unit then storing the signal input by the signal receiving unit while the relevant signal is not used by the outputting unit using the signal being output from the image reading unit.

10 Claims, 22 Drawing Sheets

FIG. 4

| FAX OPERATION | RESOURCES REQUIRED |
|---|---|
| DUPLICATION | SCANNER + PLOTTER |
| IMMEDIATE PRINTING RECEIVING | CCU + DCR + PLOTTER |
| MEMORY RECEIVING | CCU + DCR |
| MEMORY DATA OUTPUT | DCR + PLOTTER |
| REPORT OUTPUT | PLOTTER |
| ⋮ | |
| IMMEDIATE TRANSMISSION | SCANNER + DCR + CCU |

FIG. 5

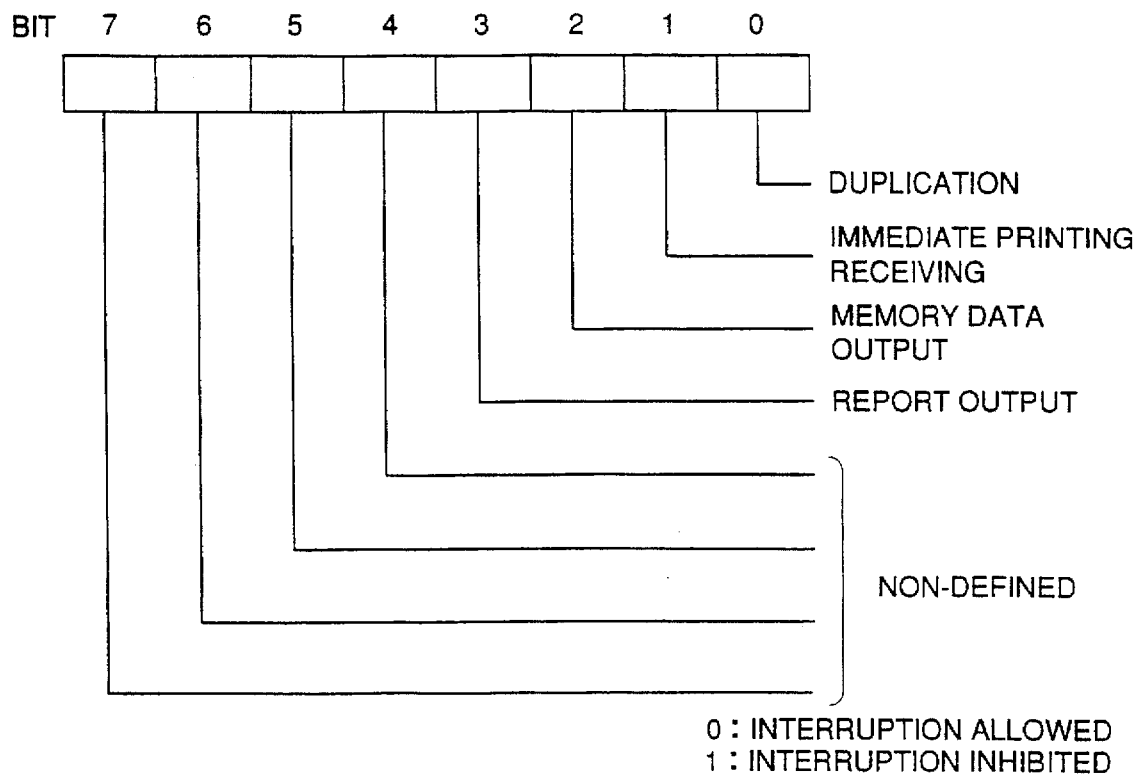

BIT 7 6 5 4 3 2 1 0

- DUPLICATION
- IMMEDIATE PRINTING RECEIVING
- MEMORY DATA OUTPUT
- REPORT OUTPUT
- NON-DEFINED

0 : INTERRUPTION ALLOWED
1 : INTERRUPTION INHIBITED

FIG.22

| FUNCTION TYPE NUMBER | |
|---|---|
| 01 | REPORT PRINTING |
| 02 | MEMORY STORED DATA PRINTING |
| 03 | DUPLICATING |
| 04 | IMMEDIATE TRANSMISSION |
| 05 | MEMORY TRANSMISSION |
| 06 | RECEIVING |
| 07 | DATA STORING |
| 08 | PRINTER PRINTING |

COMPOSITE FACSIMILE APPARATUS HAVING FUNCTION FOR ACHIEVING EFFICIENT USE OF LIMITED RESOURCES

This is a Division of application Ser. No. 08/208,294 filed on Mar. 10, 1994 now U.S. Pat. No. 5,644,405.

BACKGROUND OF THE INVENTION

1. Field of the Invention

The present invention relates to a composite facsimile apparatus and in particular relates to a composite facsimile apparatus having not only a facsimile function but also duplication function.

2. Related Art

A facsimile apparatus in which another operation may be performed as a result of interrupting a currently performed operation is well known. Japanese Laid-Open Patent Application No. 4-13368 discloses an apparatus in which a currently performed facsimile transmission operation-is halted due to a certain interruption and after the operation started by the interruption has been completed, the halted operation is then restarted by using the relevant destination address stored appropriately. Japanese Laid-Open Patent Application No. 4-8065 discloses an apparatus in which facsimile received data memory input of facsimile received contents takes priority over data memory for facsimile transmission. Japanese Laid-Open Patent Application No. 2-235076 discloses an apparatus on which an interruption/reservation key is provided for improving operation efficiency. Japanese Laid-Open Patent Application No. 1-292966 discloses an apparatus in which an operation to be started due to interruption takes priority over a currently performed operation and the thus interrupted currently performed operation is then started immediately after the completion of the operation started due to the interruption.

In addition, the following apparatuses are disclosed:

(1) In the apparatus of Japanese Laid-Open Patent Application No. 4-134965, a case is handled in which image information for one image stored in a memory has a plurality of specified destination addresses. After completion of the image data transmission for a certain destination address, interruption is allowed to be performed. After the completion of the operation started due to the interruption, the image information is transmitted to another destination address selected in accordance with the priority level.

(2) In Japanese Laid-Open Patent Application No. 2-65559 apparatus, transmission operation takes priority over receiving operation by setting transmission priority mode. In this mode, automatic receiving is inhibited and transmission specification data is saved.

(3) In Japanese Laid-Open Patent Application No. 62-209972 apparatus, an interruption mode and reservation mode are provided. These modes are effectively used so that waiting time will be reduced as much as possible and an urgent document will be transmitted with priority.

(4) In Japanese Laid-Open Patent Application No. 4-276767 apparatus, transmission selecting means is used to arbitrarily select from among an interruption mode, waiting mode, and rejection mode. The operator may select the interruption mode if the operator is not in a hurry to carry out document duplication with the relevant apparatus. Thus, priority is given to a printer (using data provided by a host computer, for example) operation in the apparatus.

(5) In Japanese Laid-Open Patent Application No. 4-335661, a composite apparatus has a printer function (using data provided by a host computer, for example) as well as a duplicator function. A composite mode is used in which a document which has been printed by the printer function is carried to an appropriate position such that the carried document may be used as an original in the duplicator function. If such a composite mode operation is specified during printer or duplicator independent mode operation being performed, the specified composite mode operation is delayed until the independent mode operation is completed.

The following methods are known in which image information transmission/receiving operation which was halted due to interruption is started after the operation started due to the interruption is completed.

(6) In the apparatus of Japanese Laid-Open Patent Application No. 4-315368, when a priority printing instruction is set, allowability of actual priority printing operation is discussed between the facsimile apparatuses in both sides in the suitable protocol. If the permission is determined as a result of the discussion, priority is given to a desired image information to be printed first over a previously received image information.

(7) In Japanese Laid-Open Patent Application No. 4-8056 apparatus, if memory data transmission is interrupted so as to input data to the relevant memory, the relevant memory data transmission is halted and dummy data is transmitted during the data input into the memory. Thus, the relevant communication line is saved for the purpose that the halted memory data transmission will be immediately started after the completion of the interrupting data input operation.

(8) The apparatus of Japanese Laid-Open Patent Application No. 62-281569 stores data indicating a destination address to be used in document transmission. The stored destination address is effectively used for transmitting the relevant document as follows. The transmission of the relevant document may be halted by another transmission operation. Then, after the completion of the interrupting transmission operation, the interrupted transmission of the document is started using the stored relevant destination address.

Further, priority is given to facsimile transmission/receiving in these disclosed composite facsimile apparatuses. As a result, in contrast to a simple duplicator, convenient usage as a duplicator is limited in such composite facsimile apparatuses. This is because such a composite facsimile apparatus has only one device for each function of information reading, information writing, and information communicating. Thus, simultaneous usage of each device is impossible to be achieved. In one example, if a user intends to carry out document duplication in an apparatus which currently performs facsimile operation, the user is needed to wait for the completion of the facsimile operation or the user has to halt the facsimile operation. Further, the user cannot carry out document duplication while the apparatus performs managing report (for managing operations which have been performed by the relevant apparatus) output or stored information output operation. Further, document duplication operation will be halted if the apparatus automatically starts any of facsimile receiving, stored document output, and managing report output operation.

Further, recently, it is desired that such a composite facsimile apparatus is provided with improved duplicator function in with convenience level similar to a simple duplicator and also is provided with a printer function (using data provided by a host computer, for example). However, each of the disclosed apparatuses (1), (2) and (3) refers to only inter-facsimile-operation interruption operation (i.e. an operation by which one facsimile operation is interrupted by another facsimile operation). Each of the disclosed apparatuses (4) and (5) comprises a composite apparatus having only duplication function and printer function (using data provided by a host computer, for example) but not having a facsimile function. Thus, each of the apparatuses (1)–(5) cannot be applied to a recently desired composite facsimile apparatus such as described above.

Such a composite apparatus has, as mentioned above, only one resource for each system of reading system, writing system and communicating system. Problems may occur if some operations are intended to be carried out simultaneously or if one resource is needed for simultaneously processing some files.

Concretely, some files may be stored in a memory without being printed out, which files were received via facsimile. In such a case, the relevant facsimile apparatus cannot be used as a printer (using data provided by a host computer, for example) after the stored file has started to be printed out until printing out of the all the stored files has been completed. This is because the apparatus has the only one writing (printing) resource which can be used for single purpose at once.

Thus, even if the relevant composite facsimile apparatus is needed to be used as a printer immediately, it is necessary to wait for the completion of the printing out of the all the stored files. Also, if the relevant composite facsimile apparatus needs to be used as a duplicator, the user is needed to pay attention to ensure such a usage. Setting the relevant composite facsimile apparatus is not allowed so that the apparatus can be used as if the apparatus were a simple duplicator.

Japanese Laid-Open Patent Application No. 4-159848 discloses an apparatus which counts the usage frequency for each function. With the thus counted usage frequencies for the respective functions, the highest-usage-frequency function is determined. Then, the apparatus automatically sets the initial mode so that the user may use the highest-usage-frequency function immediately. However, this apparatus is not made based on an object of improving interruption function in a composite facsimile apparatus.

Further, in the above disclosed apparatus (6), an information file, the reception of which had been interrupted, has its reception restarted after the operation started due to the interruption. However, this refers only to priority to be given to a facsimile receiving operation over another facsimile receiving operation. Thus, the relevant technology cannot be applied to a composite facsimile apparatus. Further, in a case where a currently received image printing operation or a previously received and stored image printing operation is halted by the interruption and the memory has previously stored some files of image information, a problem may occur due to lack of means for determining which file is to be used for being printed after completion of the operation started due to the interruption.

The above problem is further described. In a case where the memory has previously stored 5-page file A and 7-page file B, it is to be assumed that interruption occurs while the third page in the file A is being printed. After the operation (document duplication operation, for example) started due to the interruption is completed, then, since the writing (printing) system resource becomes free, the interrupted and thus halted printing operation is to be restarted.

In this case, since the above file A was already started and then was printed, although partially (1–3 pages of five pages), the subsequent file B is then selected to be printed. As a result, the seven pages of file B are stacked on the already printed and then stacked first three pages of file A. Then, after that, the remaining two pages, fourth page and fifth page of file A is stacked on the seven pages of file B. Thus, due to the interruption, the correct page stacking order could not be achieved.

Further, each of the above disclosed apparatuses (7) and (8) transmits an image information file which was once started to be transmitted and then halted due to interruption. However, this refers only to priority to be given to a facsimile transmission operation over another facsimile transmission operation. Thus, the relevant technology cannot be applied to a composite facsimile apparatus.

SUMMARY OF THE INVENTION

An object of the present invention is to provide an apparatus in which document duplication operation may be immediately started, even during the operation of printing currently received facsimile data, without halting the facsimile receiving operation.

Another object of the present invention is to provide an apparatus in which document duplication operation may be immediately started even during managing report output.

Another object of the present invention is to provide an apparatus in which a facsimile receiving operation may be carried out even during an operation started due to interruption by using a memory receiving function in the relevant facsimile receiving operation.

Another object of the present invention is to provide an apparatus in which automatic output of both a received and stored document and a managing report is inhibited. Thus, an operation started due to interruption is prevented from being halted.

Another object of the present invention is to provide an apparatus in which the user can arbitrarily set predetermined operations to which interruption is allowed to be made based on the priority level thereof.

Another object of the present invention is to provide an apparatus by which a file which was being output and output was halted due to interruption is output first after the completion of the operation started due to the interruption even if another file is also waiting to be output. Thus, the correct printing page order is saved. In the above described case where the memory has previously stored 5-page file A and 7-page file B, it is to be assumed that interruption occurs while the third page in the file A is being printed. After the operation (document duplication operation, for example) started due to the interruption is completed, the remaining fourth and fifth pages of the file A are first printed. Then, the seven pages of the subsequent file B are printed. As a result, the correct page stacking order can be achieved.

Another object of the present invention is to provide an apparatus in which a marking is made by printing on the first part of the printed page which is printed after the completion of the operation started due to the interruption. Thus, the user can easily identify the restart page of an interrupted file. As a result, the user can consider the relevant page as a part of the previously printing interrupted document. Thus missing pages are prevented. In one example, if printing of a document is halted by interruption, it is not clear whether or not the relevant document has been completely printed. There may be a case where the operator misunderstands, thinking that the document has been completely printed although some pages of the document are left unprinted. However, even in such a case, the marking provided on the later printed page notifies the operator that the remaining pages exist.

Another object of the present invention is to provide an apparatus by which the printing for the printing-interrupted document is always made from the first page even though some pages have been already printed before the interruption. Thus, missing pages can be completely prevented.

Another object of the present invention is to provide an apparatus by which file transmission information relevant to the file, the transmission of which file has been interrupted, is stored. Thus, when the file is started to be transmitted after the completion of the operation started due to the interruption, the operator's redialing of the remote facsimile telephone number is not needed because the stored file transmission information indicates the relevant facsimile telephone number. Further, a problematic situation may be eliminated in which another calling results in 'page 1' is printed together with TTI (transmitter terminal identification) information so that the receiver cannot determine that new time transmission continues from the previously halted document transmission.

Another object of the present invention is to provide an apparatus by which file storing information relevant to the file which has been interrupted from being stored for transmission is stored. Thus, the file to be started to be stored for transmission first after the completion of the operation started due to the interruption is easily identified and the relevant storing operation may thus be started at once.

Another object of the present invention is to provide an apparatus in which the use of the various functions available in the apparatus is inhibited except for a desired operation so that the desired operation may be ensured to be carried out at once without waiting until another operation is completed.

Another object of the present invention is to provide an apparatus in which the above inhibition state is displayed so that the user may easily monitor the inhibition state. Thus, a problematic situation may be eliminated in which the operator cannot understand the reason for disabling of some functions, the disabling being due to the inhibition.

Another object of the present invention is to provide an apparatus in which the inhibition may be automatically invalidated after the desired operation has been completed, even if the invalidation of the inhibition is omitted by the operator. Thus, the inhibition is prevented from interfering with automatic facsimile receiving operation, for example.

Another object of the present invention is to provide an apparatus in which the inhibition may be automatically invalidated after a predetermined time period elapses while the relevant function which should have been executed for the particular file during inhibition of processing other files is left unused. Thus, a plurality of desired operations may be successively performed with an idle time therebetween shorter than the above predetermined time period. Thus, frequent inhibition validation/invalidation by the operator may be eliminated even if a plurality of desired operations are to be performed.

Another object of the present invention is to provide an apparatus in which the function usage inhibition setting is made depending on the day of the week and/or the time of the day. Thus, the inhibition procedure is automatically controlled depending on day of the week and/or time of the day. Thus, even if the manager of the relevant apparatus is absent, a user may employ a desired function if the day of the week and/or time of the day conditions are fulfilled. Thus, it is possible to inhibit the use of the functions available in the apparatus excepting functions concerning files to be received via the facsimile function during off days and/or off times.

Thus, the convenience of use of the apparatus may be highly improved.

Other objects and further features of the present invention will become more apparent from the following detailed description when read in conjunction with the accompanying drawings.

BRIEF DESCRIPTION OF THE DRAWINGS

FIG. 4 shows a resource registering table for registering resources required for respective functions/operations used in the apparatus shown in FIG. 1;

FIG. 5 shows an interruption allowing operation setting example in the apparatus shown in FIG. 1;

FIG. 22 shows function types used in the operation shown in FIG. 19;

DESCRIPTION OF THE PREFERRED EMBODIMENTS

A construction of a composite facsimile apparatus in first through tenth embodiments of the present invention will be described with reference to FIG. 1.

Figure 1:
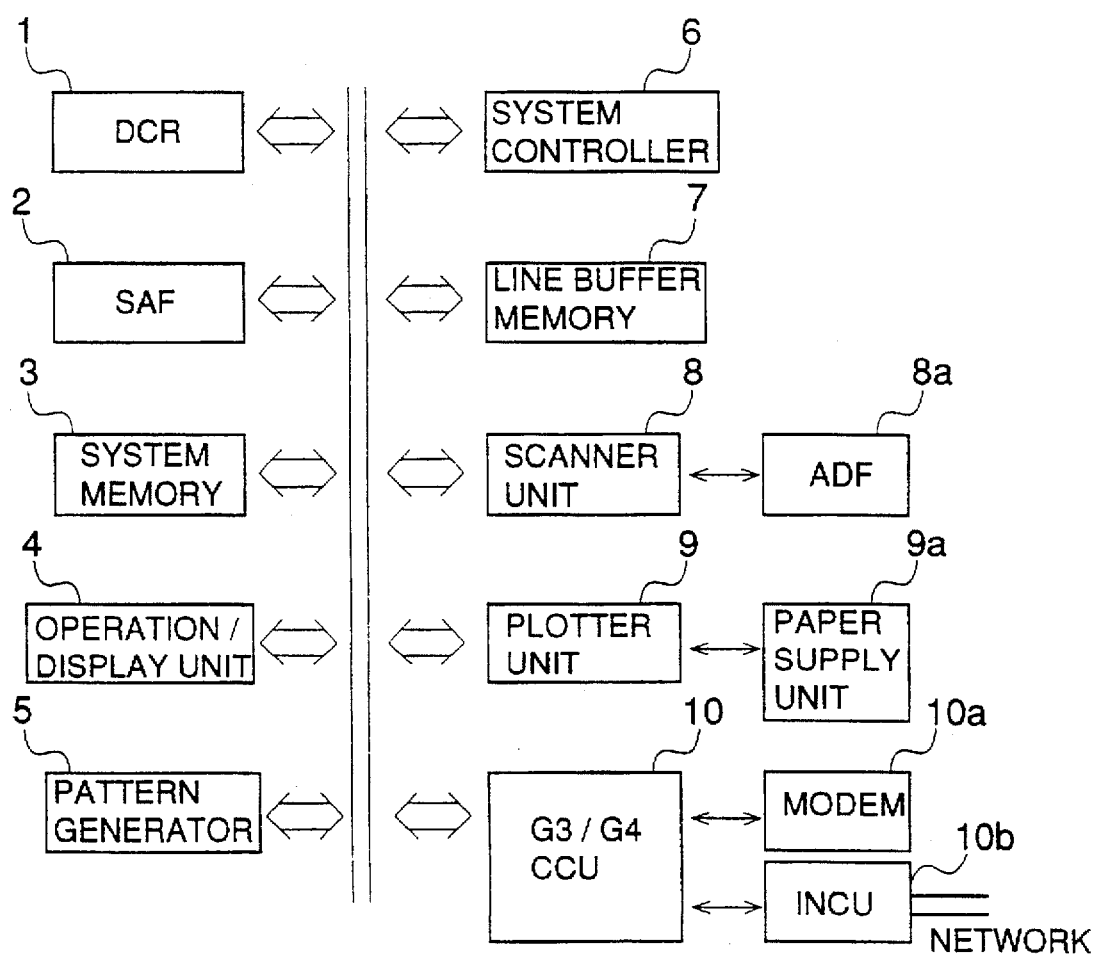
FIG. 1 shows a block diagram of a composite facsimile apparatus in any of first-tenth embodiments of the present invention.

In FIG. 1, the composite facsimile apparatus comprises: DCR (image information compressing/reproducing unit) 1; SAF (image information storing memory) 2; system memory 3 for storing system managing data; operation/display unit 4 having an input unit including 10-key keypad, start key and so forth and a liquid crystal display unit; pattern generator 5 for converting a character code into a character pattern; system controller 6; line buffer memory 7 acting as a data transfer memory; scanner unit 8 for reading a document to be transmitted and document to be duplicated; ADF (automatic document feeding unit) 8a provided with a document width sensor; plotter unit 9 for printing a document on a recording paper sheet; paper supplying unit 9a for feeding a recording paper sheet; CCU (communication control unit) 10, MODEM (modulating/demodulating unit) 10a; and INCU (ISDN control unit) 10b.

This composite facsimile apparatus shown in FIG. 1 has an immediate printing receiving mode and memory receiving mode. In the immediate printing receiving mode, while data is received via facsimile, the thus received data is immediately output through the plotter unit 9. In the memory receiving mode, the thus received data is temporarily stored in the SAF 2 before being printed out, the SAF 2 storing the relevant data until the relevant data reception is completed. In addition to this facsimile function, the composite facsimile apparatus shown in FIG. 1 has a duplication function.

The plotter 9 is used for printing data both received by facsimile and read through the scanner 8.

The system controller 6 acts as immediate printing receiving detecting means for detecting whether or not the immediate printing receiving operation is being performed. The operation/display unit 4 acts as an interruption instruction input means for an operator to specify therethrough an interruption instruction to interrupt a currently performed operation in the apparatus. The system controller 6 also acts as control means for controlling switching operation between the immediate printing and memory receiving mode and also controlling the operation in the plotter 9. If an interruption instruction is input during the immediate printing receiving operation, the system controller 6 switches the current operation mode from the immediate printing receiving mode to the memory receiving mode. Further, the system controller 6 prevents the plotter unit 9 from further performing printing operation in the immediate printing receiving mode. Thus, the plotter unit 9 becomes free so that the unit 9 may be used for the document duplication operation.

Operation in the composite facsimile apparatus shown in FIG. 1 in a first embodiment is described with reference to FIGS. 2–9. In flow charts shown in FIGS. 6–16, 19, 23–26, 'S1–S187' respectively represent 'steps S1–S187' and 'P1–P15' respectively represent 'steps P1–P15'.

Figure 2:
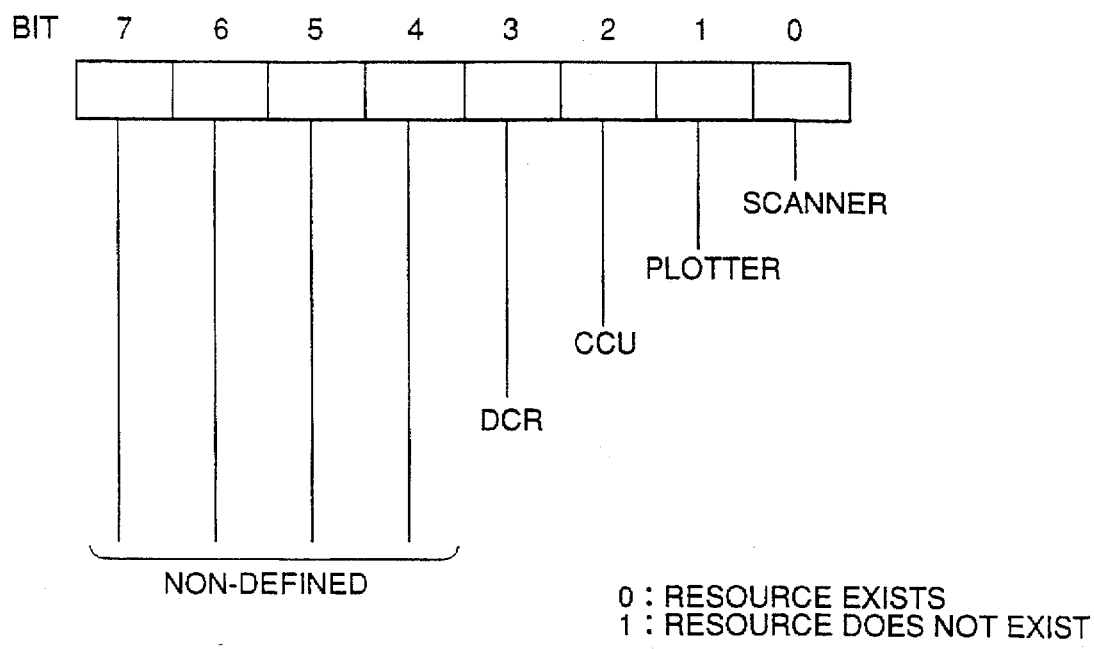
FIG. 2 shows a resource list of scanner, plotter, CCU and DCR used in the apparatus shown in FIG. 1.
Figure 6:
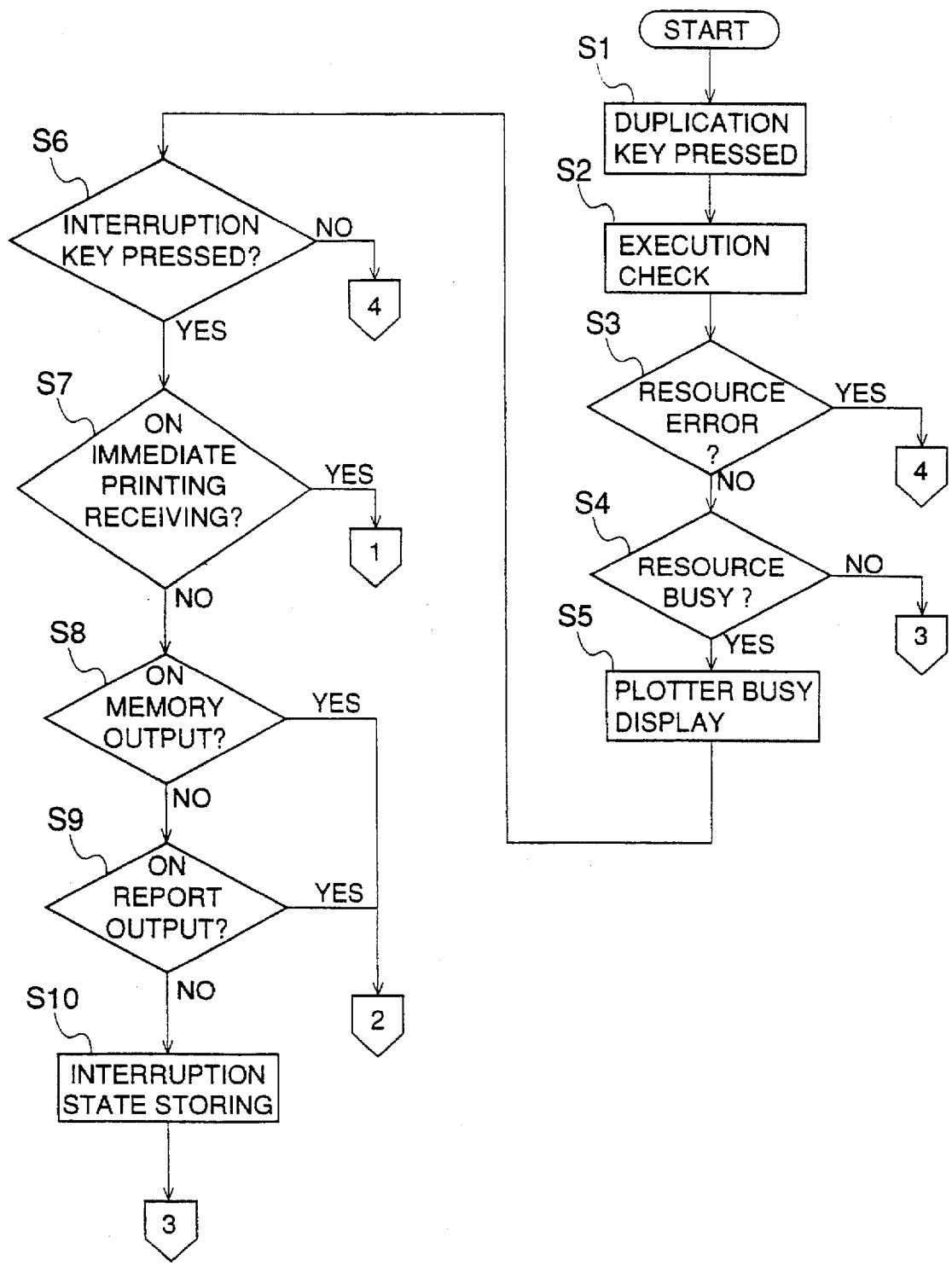
FIGS. 6, 7, 8 and 9 show an operation flow concerning an interruption controlling operation in the apparatus shown in FIG. 1 in any of the first and second embodiments.

In order to start document duplication operation, the operator should press a copy key on the operation/display unit 4 in S1 in FIG. 6. Then in S2, a resource (the scanner unit 8, plotter unit 9, CCU 10, DCR 1, and so forth) list shown in FIG. 2 is checked. One bit is assigned to each resource in the resource list in S3. '1' in the-bit indicates that the corresponding resource exists and '0' indicates that the corresponding resource does not exist. The resource list is stored in the system memory 3. In the document duplicating operation, the scanner unit 8 and plotter unit 9 are checked in S4.

The resources required for each operation are stored in the system memory 3 as a table shown in FIG. 4. If the required resources cannot be used because the relevant resources are busy in S4, an error message is displayed on the operation/display unit 4. In one example of FIG. 6, the error message comprises 'the plotter is being used'.

Then, in S6, the operator presses the interruption key on the operation/display unit 4. In S7, if the plotter unit 9 is being used in the immediate printing receiving operation, the system controller 6 which is controlling the immediate printing receiving operation is notified the interruption request occurs.

Figure 3:
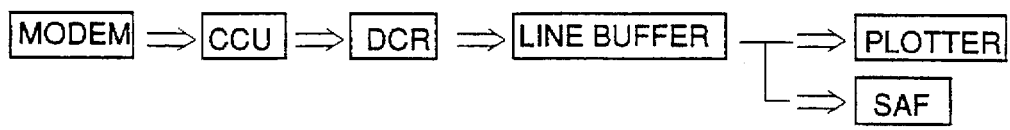
FIG. 3 shows a received data flow in the apparatus shown in FIG. 1.
Figure 7:
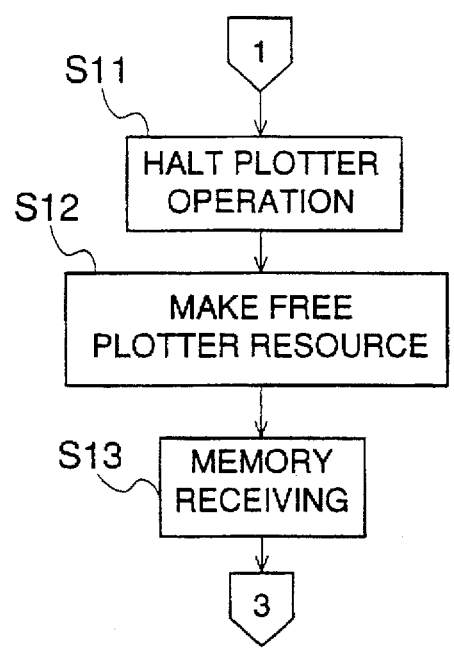
Figure 8:
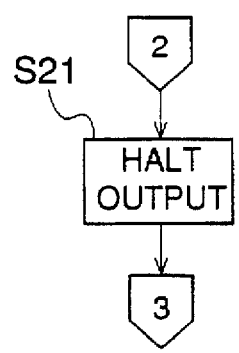
Figure 9:
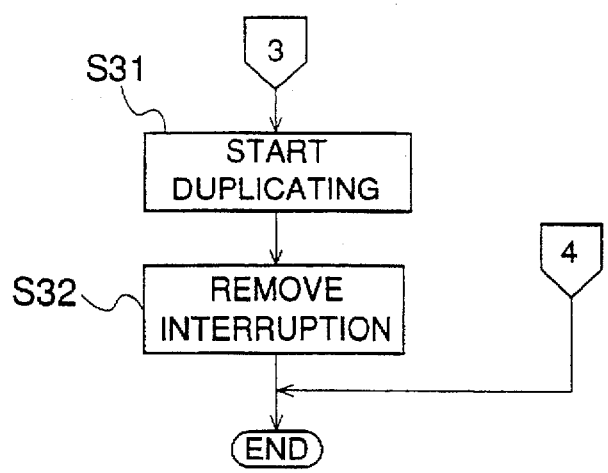

The system controller 6, after thus receiving the interruption request, prevents the plotter unit 9 and paper supply unit 9a from further performing the printing operation in S11 in FIG. 7. Then, the system controller 6 controls the data received via facsimile to be sent to the SAF 2 from the line buffer memory 7 as shown in FIG. 3.

After the data flow has been thus switched, the plotter bit in the resource list in the system memory 3 is set to '1' indicating that the plotter unit 9 can be used. Thus, the resource, plotter unit 9, becomes free in S12 in FIG. 7 and the facsimile receiving mode becomes the memory receiving mode in S13.

Thus, in the composite facsimile apparatus in this embodiment, pressing of the interruption key causes the switching of the current facsimile operation mode from the immediate printing receiving mode into the memory receiving mode while the facsimile receiving operation is prevented from being halted on the way. In S31 in FIG. 9, document duplication operation can be carried out and the operator is thus not required to wait for the completion of the facsimile operation. Thus, the operator's work efficiency is improved.

Operation in the composite facsimile apparatus shown in FIG. 1 in the second embodiment is described.

In the operation, the composite facsimile apparatus has a managing report output function in addition to the above-mentioned-immediate printing receiving, memory receiving and duplication functions. The managing report output function comprises a function of outputting a managing report which is used for managing the composite facsimile apparatus's operation.

In the composite facsimile apparatus in the second embodiment, the plotter unit 9 acts to output the above managing report in addition to the above facsimile receiving data outputting and duplication outputting functions.

The operation/display unit 4 is also used for interrupting the currently performed operation as described above.

The system controller 6 controls the printing operation in the plotter unit 9. Further, if an interruption instruction is input while the plotter unit 9 is busy printing in a memory data output operation or in a managing report output operation, the system controller 6 prevents the plotter unit 9 from further performing the printing. (There, in the memory data output operation, the data received through the memory receiving operation is output). Thus, the plotter unit 9 becomes free so that the plotter unit 9 can be used for document duplication operation.

In the above described operation in the composite facsimile apparatus in the first embodiment, document duplication operation is enabled during facsimile receiving operation. In the composite facsimile apparatus in the second embodiment, document duplication operation is enabled both during memory data output operation and during managing report output operation. The relevant operation is described with reference to FIGS. 6–9.

Similarly to the operation in the above composite facsimile apparatus in the first embodiment, the operator presses the duplication key on the operation/display unit 6 in S1 in FIG. 6. Then, the resource list is checked in S2. Respective bit values are determined in the resource list and stored in the system memory 3 in S3. In S4, the scanner unit 8 and plotter unit 9 are checked. An error message such as mentioned above is displayed as described above in S5. The operator presses the interruption key on the operation/display unit 4 in S6.

If the plotter unit 9 is being used in the memory data output operation or managing report output operation in S8 or S9, the system controller 6 which is controlling the memory data output operation or managing report output operation is notified that the interruption request occurs. The system controller 6, after thus receiving the interruption request, prevents in S21 in FIG. 8 the memory data output operation or managing report output operation from being further performed. Then, in S31 of FIG. 9, the plotter unit 9 which was being used becomes free and the relevant bit of the resource list is set to '1' indicating that the plotter unit 9 can be used.

Thus, in the composite facsimile apparatus in the second embodiment, pressing of the interruption key causes the memory data output operation or managing report output operation to be halted on the way. Thus, document duplicating operation can be immediately carried out in S31. The memory data output operation or managing report output operation interrupted in S21 will be later restarted from the interrupted page. Thus, the operator's work efficiency is improved.

Next, the composite facsimile apparatus in the third embodiment of the present invention is described.

The composite facsimile apparatus in the third embodiment has the immediate printing receiving and memory receiving facsimile function, and duplicating function similar to those of the apparatus in the above first embodiment.

The operation/display unit 4 acts as interruption instruction input means for inputting an interruption instruction for interrupting a currently performed operation in the apparatus.

The system controller 6 acts as control means for controlling switching operation for selecting an appropriate mode from among the immediate printing receiving mode and memory receiving mode. The system controller 6 also acts as interruption instruction removal detecting means for detecting whether the interruption instruction input to the operation/display unit 4 has been removed.

If an incoming call arrives at the apparatus during a period starting at a time an interruption instruction is input and ending at a time the interruption instruction is removed, the system controller 6 always sets the facsimile receiving mode to the memory receiving mode.

Figure 10:
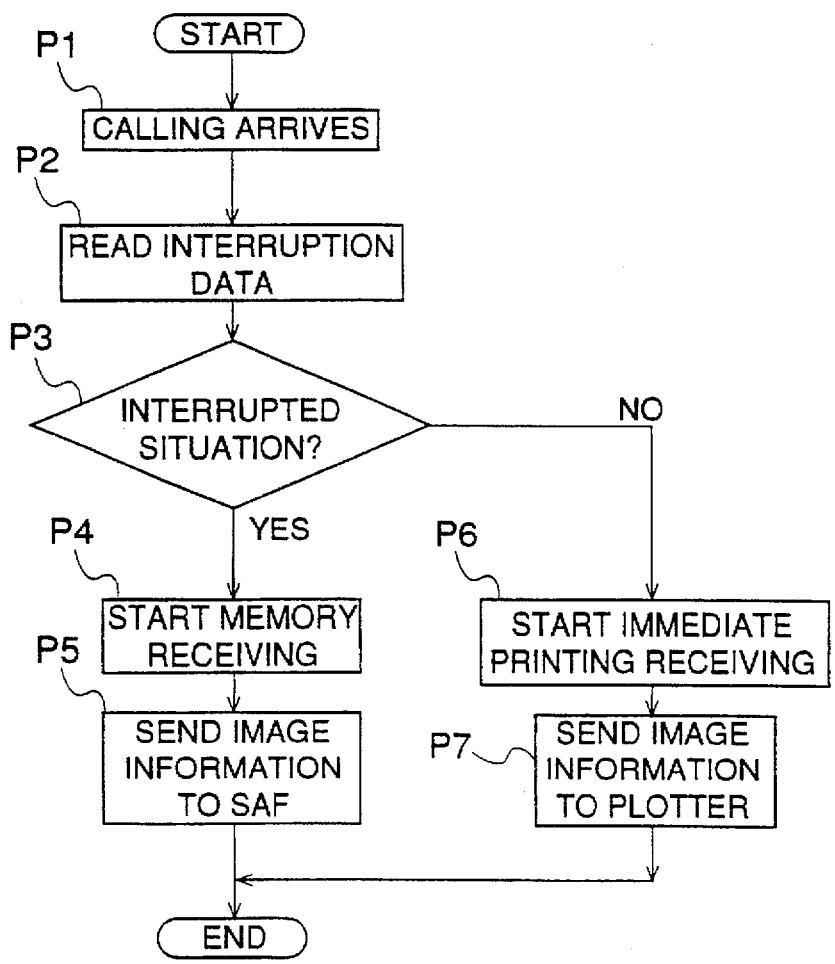
FIG. 10 shows an operation flow concerning an interruption controlling operation in the apparatus shown in FIG. 1 in the third embodiment.

Operation in the composite facsimile apparatus in the third embodiment of the present invention is described with reference to FIG. 10.

If the interruption key in the operation/display unit 4 is pressed, information indicating this fact is stored in the system memory 3. If iNCU 10a detects a call in P1, this matter is reported to the system controller 6 via the CCU 10. In P2, the system controller 6 reads from the system memory 3 the data indicating the interrupted condition. In P3, if the read data indicates that the interruption instruction has been input, the facsimile receiving mode is set as the memory receiving mode. If not, the facsimile receiving mode is set as the immediate printing receiving mode. Then, the relevant required resources are checked by using the required resource registration table shown in FIG. 4. In the case of the memory receiving mode, the CCU 10 and DCR 1 are needed. In the case of the immediate printing receiving mode, the CCU 10, DCR 1 and plotter unit 9 are needed. The relevant resources are then removed from the resource list shown in FIG. 2. That is, the corresponding bits are set to be '0'.

If the current mode comprises an interrupted mode (starting as a result of inputting of an interruption instruction) in P3, the memory receiving mode is set in P4. Then, the facsimile received data is stored in the SAF 2 from the starting page of the data in P5. Then, a duplication operation, as an operation started due to interruption, can be performed in the apparatus even though the facsimile receiving is being performed because the plotter unit 9 is not being used. The duplication operation may be started by pressing the duplication key on the operation/display unit 4 after the relevant duplication specifications have been input.

Thus, in the composite facsimile apparatus in the third embodiment of the present invention, during performance of an operation started due to interruption, all facsimile receiving operations are made to be performed in the memory receiving mode. Therefore, an operation to be started due to interruption may be immediately performed without halting a currently performed facsimile receiving operation.

Next, the composite facsimile apparatus in the fourth embodiment of the present invention is described.

The composite facsimile apparatus in the fourth embodiment has the immediate printing receiving and memory receiving facsimile function, duplication, and managing report output function similar to those which the composite facsimile apparatus in the above second embodiment has.

The operation/display unit 4 acts as interruption instruction input means for inputting interruption instruction for interrupting a currently performed operation in the apparatus.

The system controller 6 acts as control means for automatically periodically outputting a managing report and memory stored facsimile received data if any. The system controller 6 also acts as interruption instruction removal detecting means for detecting whether the interruption instruction input to the operation/display unit 4 has been removed. During a period starting from the time an interruption instruction is input and ending at the time the interruption instruction is removed, the system controller 6 inhibits both any managing report and any memory stored facsimile received data from being output.

Figure 11:
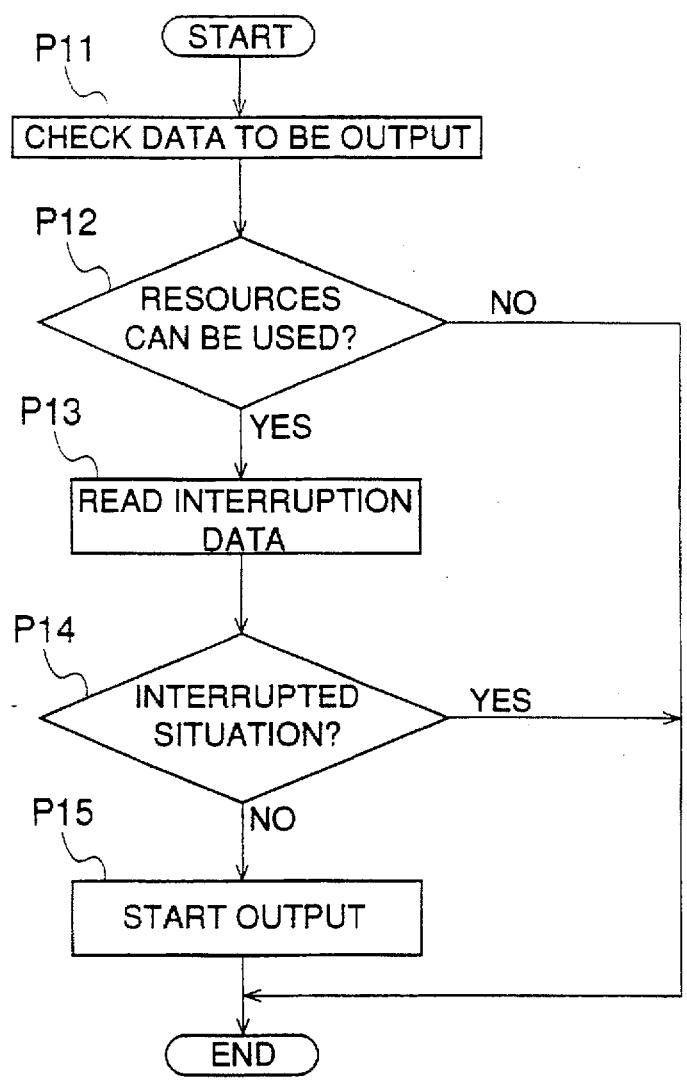
FIG. 11 shows an operation flow concerning an interruption controlling operation example in the apparatus shown in FIG. 1 in the fourth embodiment.

With reference to FIG. 11, operation in the composite facsimile apparatus in the fourth embodiment of the present invention is described.

If the interruption key in the operation/display unit 4 is pressed, information indicating this fact is stored in the system memory 3. Then, in P11, the system controller 6 checks, at constant interval (several milliseconds), whether any operation to be performed, such as managing report or memory stored facsimile receiving data outputting operation, for example, exists in the apparatus. Then, if it is determined in P12 that the relevant required resources are free to be used, the system controller 6 reads in P13 the data indicating whether or not the apparatus is currently in an interrupted state. If the relevant data indicates that the current situation comprises an interrupted situation, as determined in P14, any operation using the plotter resource is not performed.

There, it is checked by using the required resources registration table shown in FIG. 4 whether the relevant operation, a managing report or memory stored facsimile received data outputting operation, for example, needs the plotter unit. An operation such as a managing report or memory stored facsimile received data outputting operation needs the plotter unit. Thus, such an operation is not performed. That is, during an interrupted state period, no managing report nor memory stored facsimile received data, if any exists, is output. Thus, a duplication operation, as an operation started due to interruption, can be performed in the apparatus although the facsimile receiving is being performed because the plotter unit 9 is not being used. The duplication operation may be started by pressing the duplication key on the operation/display unit 4 after the relevant duplication specifications have been input. If the current state does not comprise such an interrupted state, as determined in P14, the relevant operation to be originally performed, a managing report or memory stored facsimile received data outputting operation, for example, is performed.

Thus, in the composite facsimile apparatus in the fourth embodiment of the present invention, information indicating such an interrupted state is stored. Thus, if any operation other than the operation started due to the interruption exists to be automatically performed by chance during the interrupted situation period, the operation started due to the interruption does not need to be halted and may be continued. The operation other than the operation started due to the interruption may comprise a managing report or memory stored facsimile received data outputting operation. Thus, user's work efficiency can be improved.

Next, the composite facsimile apparatus in the fifth embodiment of the present invention is described.

The composite facsimile apparatus in the fifth embodiment has both facsimile communication and document duplication functions.

The operation/display unit 4 acts as interruption instruction input means for interrupting a currently performed operation.

The system controller 6 acts as operation detecting means for detecting which operation is currently performed. The system controller 6 also acts as interruption operations setting means for setting operations selected from among all operations which the apparatus is capable of performing, where interruption can be made to the thus set operations. Further, the system controller 6 also acts as interruption allowing means for allowing interruption to be made only in a case where one of the operations set by means of the interruption operation setting means is currently performed.

The operation/display unit 4 also acts as interruption operation altering means for altering the operations set by means of the interruption operation setting means.

The operator may arbitrarily specify that interruption is made to be allowed to be to a duplication operation, so as to carry out another duplication operation, facsimile receiving operation, memory stored received data printing operation, and/or managing report outputting operation. The operator may set the operations of which interruption is allowed to be made through the operation/display unit 4. The thus set operations are then stored in the system memory 3. The operator may also alter, through the thus set operations to which interruption is allowed to be made through the operation/display unit 4. Such setting may be made using a bit series shown in FIG. 5, wherein '1' in a bit indicates the corresponding operation allows interruption to be made thereto and '0' in a bit indicates the corresponding operation does not allow interruption to be made thereto. Thus, setting values of the respective bits results in the setting of the operations allowing interruption.

If the interruption key is pressed, the system controller 6 checks operations to be altered, halted and/or inhibited due the interruption. The system controller 6 reads operations stored in the system memory 3, which operations allow interruption to be made thereto. The system controller 6 compares the thus read operations allowing interruption with an operation which is currently requested to accept the relevant interruption. If the read allowing operations do not include the currently being requested operation, the relevant interruption is not made effective. If not, that is, if the allowing operations includes the currently being requested operation, the relevant interruption is made effective.

In a case where, for example, both a duplication operation and a facsimile receiving operation have been set as operations allowing interruption and a managing report outputting operation is currently requested to accept a relevant interruption, pressing of the interruption key does not result in any interruption operation. However, if a facsimile receiving operation is currently requested to accept a relevant interruption, the relevant interruption is accepted. The process to be performed after the interruption is accepted is similar to that starting from pressing of the interruption key as described with respect to the composite facsimile apparatus in any of the first-fourth embodiments.

Thus, in the composite facsimile apparatus in the fifth embodiment of the present invention, the user may improve the user's own work efficiency by appropriately specifying operations allowing interruption and/or altering the thus specified operations.

The composite facsimile apparatus in the sixth embodiment is described.

The composite facsimile apparatus in the sixth embodiment has memory receiving and immediate printing receiving facsimile functions such as described above and duplication function such as described above.

The plotter unit 9 acts as printing means for printing out both data received through the facsimile function and data input through the scanner unit 8.

The operation/display unit 4 acts as interrupting means for interrupting a currently performed operation in the apparatus.

The system control unit 6 acts as control means functioning, based on a specification made through the operation/display unit 4, both so that the image information received in the memory receiving mode is stored in the SAF 2 and so that printing out of image information received in the immediate printing receiving mode is halted and the relevant image information is then stored in the SAF 2. The system memory 3 acts as storing means for storing information for identifying a file which is received via facsimile and for which an interruption halts the receiving operation.

The system controller 6 also acts as:

duplication output starting means for starting a document duplication output operation when the means detects that the plotter unit 9 becomes free;

duplication completion monitoring means for detecting completion of duplication operation;

file information retrieving means for retrieving file processing information (such a file identification number), relevant to an image information file, from the system memory 3, where certain processing of the relevant image information file was halted due to interruption resulting in a relevant duplication operation and the thus halted printing operation waits for the plotter unit 9 to be free so that the halted certain processing operation may be started; and the above retrieval is made when the relevant duplication operation has been completed and thus the plotter becomes free; and executing means for reading the contents of the relevant image information file from the SAP 2, where the contents of the relevant image information file are thus read in accordance with the corresponding file processing information retrieved by the file information retrieving means and the thus read contents are then processed first among files stored in the SAF 2.

Figure 12:
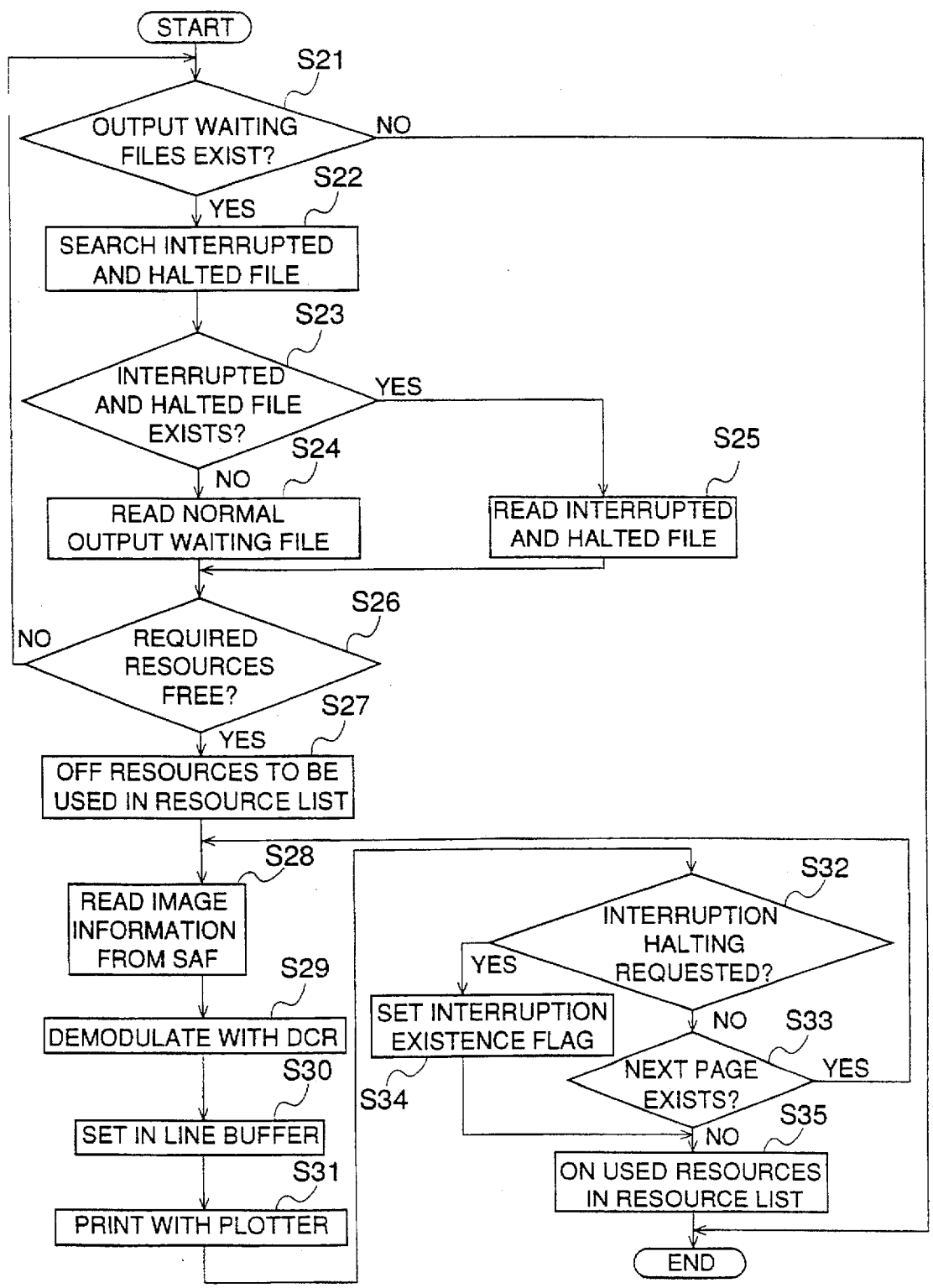
FIG. 12 shows an operation flow in the apparatus shown in FIG. 1 in the sixth embodiment.

Next, with reference to FIGS. 2–5, and 12, the operation in the composite facsimile apparatus in the sixth embodiment of the present invention is described in more detail. The processing shown in the operation flow of FIG. 12 is executed by the system controller 6. If an interruption instruction specified through the operation/display unit 4 by the operator interrupts a currently performed image information outputting operation using image information read from the SAF 2, the relevant image information is saved in the SAF 2 and the file processing information associated with the relevant image information file is stored in the system memory 3. The system memory 3 manages the thus stored file processing information. The system controller 6 then monitors execution and completion of the operation started due to the relevant interruption.

If the operation started due to the interruption has been completed, the controller 6 determines in S21 whether or not there exist any image information files in the SAF 2, the processing of which files have been halted and which files are waiting for the halted processing to be restarted. If no waiting file exists as a result of the determination in S21, the current cycle of operation is finished. If any waiting files exist, it is determined in S22 in accordance with file processing information stored in the system memory 3 whether or not the waiting files include an image information file, processing of which file has been halted due to the relevant interruption.

If no interrupted file exists, the waiting files are read in accordance with the normal practice in S24. If an interrupted file exists, the interrupted file is read first in S25, that is, it has priority.

Subsequently, it is determined in S26 whether or not the resources required for the processing of the relevant image information file are free. In a case where the relevant processing comprises a memory stored facsimile received data printing operation, the plotter unit 9 and DCR 1 are required as the resources. Thus, the resource list shown in FIG. 2 is referred to and it is determined whether or not the required resources information concerning which has been stored in the system memory 3 are free or busy, that is, whether or not the corresponding bits are '1' or '0'.

If the required resources are free, that is, if the corresponding bits are '1', '0' (OFF) is set, in S27, as the bits corresponding to the resources (the plotter unit 9 and DCR 1) to be used. Subsequently, a page of the compressed image information to be presently processed is read from the SAF 2 in S28 and the read data is demodulated by means of the DCR 1 in S29. The thus demodulated image information is set in the line buffer memory 7 in S30, is transferred to the plotter unit 9 and printed therethrough in S31. The plotter unit 9 prints the image information on a recording paper sheet provided by means of the paper supply unit 9a.

Subsequently, it is determined in S32 whether or not another interruption request is input, which requests performance of document duplication operation for example. If no other interruption request exists, it is determined in S33 whether or not the subsequent page is included in the relevant image information. If the subsequent page is included therein, S28 is again performed. If not, the bits in the resource list corresponding to the thus used resources are reset to '1' (ON) so that the relevant resources may be used by another operation. Then, the current cycle of operation is finished.

If a certain interruption request, for requesting document duplication operation for example, is input as determined in S32, interruption existence flag, for subsequently performing the operation to be started due the relevant interruption, is set in S34. Then, the bits in the resource list corresponding to the thus used resources are reset to '1' (ON) in S35 and the current cycle of operation is finished. Thus, the plotter unit 9 is made free and as a result, the scanner unit 8 and plotter unit 9 both required for the document duplication operation as shown in FIG. 4 can be used. Thus, the relevant duplication operation can be started.

In the composite facsimile apparatus in the sixth embodiment, if interruption is requested during the immediate printing receiving facsimile operation, the image information transfer flow is switched by the system controller 6 so that, as shown in FIG. 3 the relevant facsimile received image information is sent to the SAF 2 via the line buffer memory 7 from the MODEM 10a instead of being sent to the plotter unit 9 via the line buffer memory 7 from the MODEM 10a.

Thus, in the composite facsimile apparatus in the sixth embodiment of the present invention, an image information file, printing out of which file was halted due to interruption is retrieved and first printed from among waiting files after the operation started due to the relevant interruption has been completed. Thus, in one example case, where 5-page file A and 7-page file B are received via facsimile and stored temporarily in the memory receiving mode, it is to be assumed that interruption occurs while the third page in the file A is being printed. After the operation (document duplication operation, for example) started due to the interruption is completed, the following operation is performed in the composite facsimile apparatus: The remaining fourth and fifth pages of the file A are first printed; and then, the seven pages of the subsequent file B is printed. As a result, the proper file processing order may be ensured, the usage efficiency in the composite facsimile apparatus being thus improved.

The composite facsimile apparatus in the seventh embodiment of the present invention is described.

In the composite facsimile apparatus in the seventh embodiment, the system controller 6 acts as:

reading means for reading several lines in the first page in an image information file output from the SAF 2; and data inserting means for inserting arbitrary data in a part of the thus read several lines. Thus, the plotter unit 9 provided a mark at a part of the first page printed by the plotter unit 9. The first page is included in the image information file output from the SAF 2 in response to output instruction provided by the system controller 6.

Figure 13:
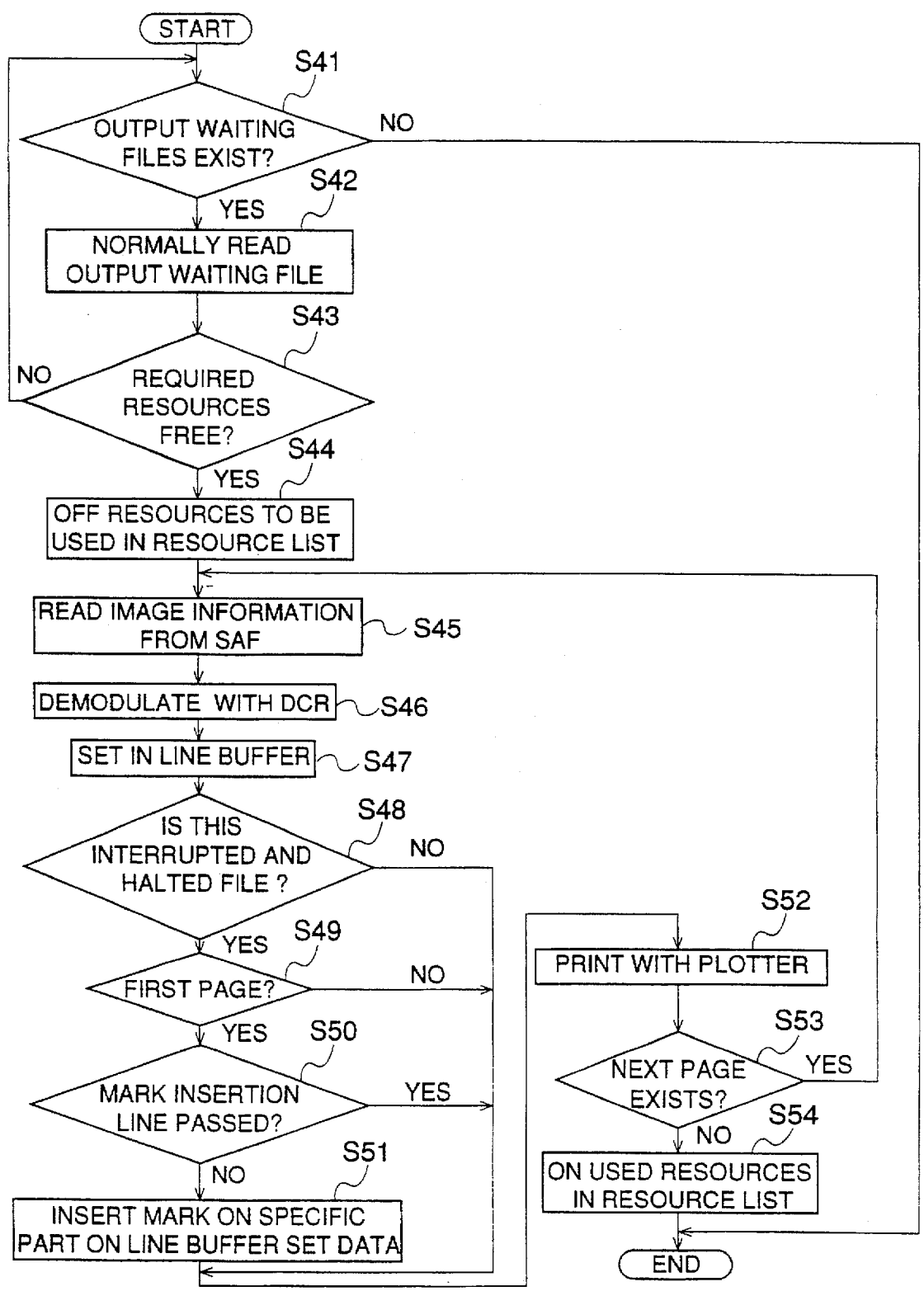
FIG. 13 shows an operation flow in the apparatus shown in FIG. 1 in the seventh embodiment.

The relevant operation is described with reference to FIG. 13. The processing shown in FIG. 13 is executed by the system controller 6.

If interruption is specified by the operator through the operation/display unit 4 so that outputting of image information from the SAF 2 is halted, the relevant image information is saved in the SAF 2 and the relevant file processing information is stored in the system memory 3 which manages the file processing information.

After the operation started due the relevant interruption is completed, it is determined in S41 whether or not waiting files are stored in the SAF 2, outputting of which files was halted and waits to be restarted. If no waiting files exist, the current operation cycle is finished. If any waiting files exist, one of the existing waiting files is read from the SAF 2 in S42.

Subsequently, it is determined in S43 whether or not the resources required for printing the thus read image information file is free. In a case for example where the relevant printing operation comprises a memory stored facsimile received data printing operation, the plotter unit 9 and DCR 1 are required as the resources. Thus, the resource list shown in FIG. 2 is referred to and it is determined whether the required resources which have been stored in the system memory 3 are free or busy, that is, whether the corresponding bits are '1' or '0'.

If the required resources are free, that is, if the corresponding bits are '1', '0' (OFF) is set, in S44, as the bits corresponding to the resources (the plotter unit 9 and DCR 1) to be used. Subsequently, a page of the compressed image information to be presently processed is read from the SAF 2 in S45 and the read data is demodulated by means of the DCR 1 in S46. The thus demodulated image information is set in the line buffer memory 7 in S47. Then, it is determined in S48 whether or not the thus line buffer set image information file comprises a file, outputting of which file was halted due to the relevant interruption.

If the set file does not comprise such an interrupted file, the file set in the line buffer memory 7 is used for printing out the corresponding image through the plotter 9 in S52. If the set file comprises such an interrupted file, it is determined whether or not the set image information comprises the first page of the corresponding document.

If the relevant image information does not comprise the first page, S52 is executed. If the relevant image information comprises the first page, it is determined in S50 whether or not the relevant image information comprises a line of the page subsequent to the line on which a mark is put. If the relevant image information comprises a line identical to or before the line on which the mark is put, the mark is inserted on a specific position on the image information set in the line buffer memory 7 in S51. Then, the resulting image information set in the line buffer memory 7 is printed through the plotter 9 in S52.

Subsequently, it is determined in S53 whether or not the subsequent page exists in the relevant image information file. If the subsequent page exists, the current operation returns to S45. If not, the bits corresponding to the thus used resources are made '1' (ON) in S54 and the current operation cycle is finished.

Thus, the composite facsimile apparatus in the seventh embodiment of the present invention marks a part of the first page of an image information file, printing of which file was halted due to interruption and is started after the completion of the operation started due to the interruption. Thus, the printed file can be easily identified as the file, the printing of which file was halted. Such a marked page may be distinguished from other normally duplicated image sheets (copies) for example. Further, it is also easily possible to relate it to the other printed pages printed before the relevant printing operation was halted due to the interruption.

That is, when a certain interruption halts printing operation for both image information being received in the immediate printing receiving facsimile mode and image information received and temporarily stored in the memory receiving facsimile mode, it is easy to determine whether or not the entirety of the relevant file has been already printed out before the relevant printing operation has been interrupted.

The composite facsimile apparatus in the eighth embodiment in the present invention is described.

In the composite facsimile apparatus in the eighth embodiment, the system controller 6 acts as paging means for paging every page of image information stored in the memory receiving facsimile mode. After an operation started due to interruption has been completed, since the stored image information may be printed as a result, the image information thus stored in the SAF 2 is printed out from the first page.

Figure 14:
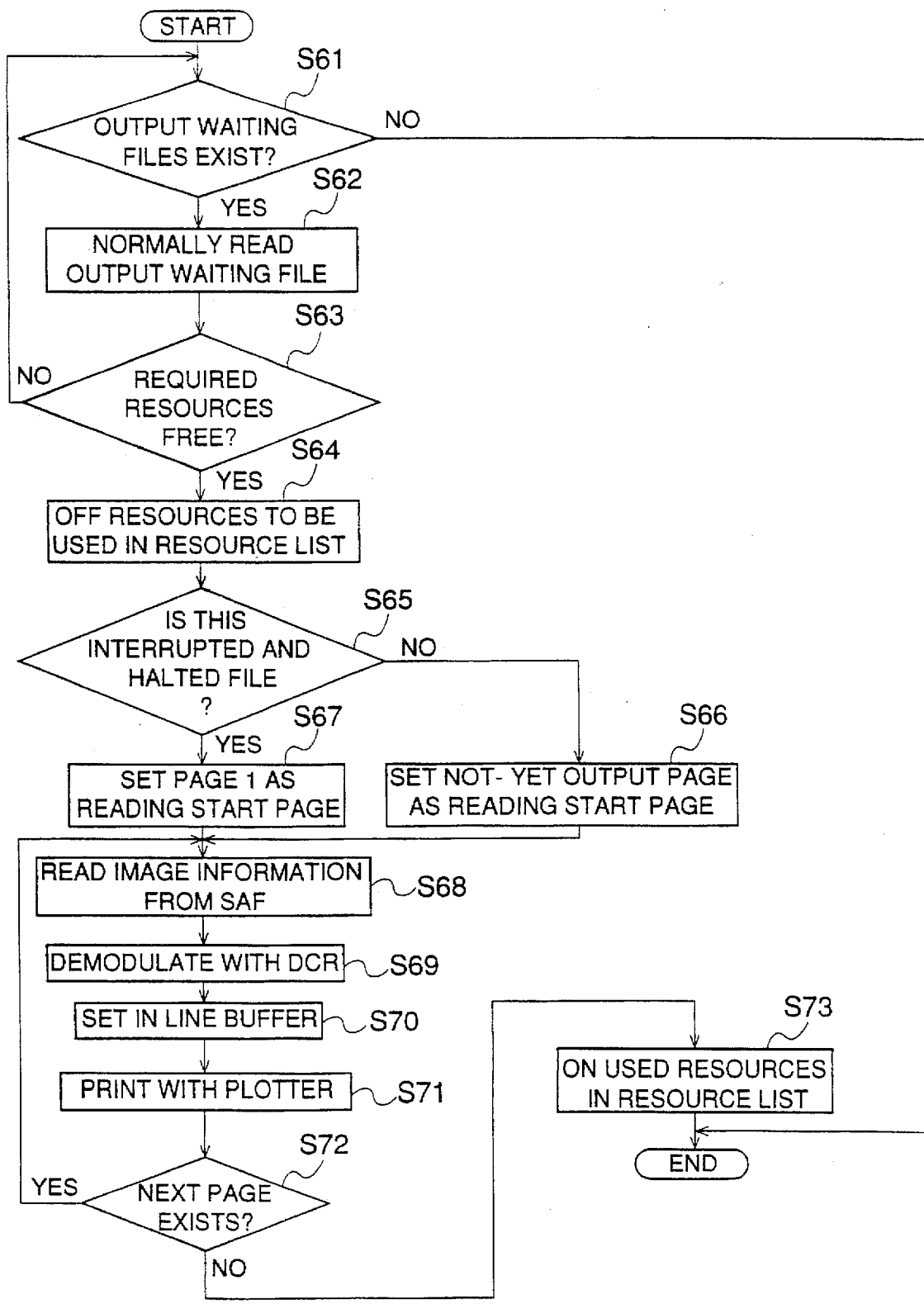
FIG. 14 shows an operation flow in the apparatus shown in FIG. 1 in the eighth embodiment.

The relevant operation is described with reference to FIG. 14 and the processing shown in FIG. 14 is executed by the system controller 6.

If interruption is specified by the operator through the operation/display unit 4 so that outputting of image information from the SAF 2 is halted, the relevant image information is saved in the SAF 2 and the relevant file processing information is stored in the system memory 3 which manages the file processing information.

After the operation started due the relevant interruption is completed, it is determined in S61 whether or not waiting files are stored in the SAF 2, outputting of which files was halted and waits to be started. If no waiting files exist, the current operation cycle is finished. If any waiting files exist, one of the existing waiting files is read from the SAF 2 in S62 in the normal practice. Subsequently, it is determined in S63 whether or not the resources required for printing the thus read image information file are free.

If the required resources are free, that is, if the corresponding bits are '1', '0' (OFF) is set, in S64, as the bits corresponding to the resources to be used. Then, it is determined in S65 in accordance with file processing information stored in the system memory 3 whether or not the image information file to be currently printed comprises a file, printing of which file was halted due to the relevant interruption.

If the relevant file does not comprises such an interrupted and halted file (halted due to interruption), that is, if the file comprises a file, printing of which file was halted due to paper blockage for example, a page number corresponding to the first page among the pages not yet printed is set in S66 as a page from which the relevant image information file will be printed. The system controller 6 has been counting every page for which printing is completed through the plotter 9 before the relevant printing operation was interrupted and halted. Thus, in one example, if the first two pages in a five-page document which was stored in the SAF 2 in the memory receiving mode have been printed and then the relevant printing operation is halted due to page blockage or the like, the page number '2' is stored in the system memory 3 as the already printed page number. In this example, the page number 131 is set as the page number from which the relevant document will be printed out.

On the other hand, if it is determined in S65 that the relevant printing operation halting resulted from the relevant interruption, the page number '1' is set in S67 as the page number from which the relevant image information file will be printed either by setting '0' as the page number which is the last page among the already printed pages or ignoring the page number previously set as the page number which is the last page among the already printed pages.

Subsequently, the first page of the compressed relevant image information file is read from the SAF 2 in S68 and the read data is demodulated by means of the DCR 1 in S69. The thus demodulated image information is set in the line buffer memory 7 in S7 and the image information is then printed through the plotter unit 9 in S71.

Subsequently, it is determined in S72 whether or not the subsequent page exists in the relevant image information file. If the subsequent page exists, the current operation returns to S68. If not, the bits corresponding to the thus used resources are made '1' (ON) in S73 and the current operation cycle is finished.

Thus, the composite facsimile apparatus in the eighth embodiment of the present invention reprints from the first page again an image information file which was once interrupted and halted on the way. Thus, the correct printing order among many printed files may be ensured and also a page among pages constituting a file may be prevented from being missed.

The composite facsimile apparatus in the ninth embodiment of the present invention is described.

In the composite facsimile apparatus in the ninth embodiment, the system memory 3 acts as storing means for storing file transmission information relevant to an image information file, which file is being transmitted in an immediate transmission facsimile mode (in which mode, image information read through the scanner 8 is immediately transmitted via facsimile without storing the relevant information) and the transmission is interrupted and halted. The system controller 6 acts as duplication output starting means for causing the scanner unit 8 to start a reading operation associated with a document duplication operation. This reading start is made when it is determined that the scanner unit 8 becomes free from carrying out of another operation.

The system controller 6 also acts as duplication completion monitoring means for detecting whether or not a duplication operation is completed. The system controller 6 also acts as reading means for reading the file transmission information stored in the system memory as mentioned above. This reading is made when the relevant interruption state is removed and the remaining pages of the file, the transmission of which file was interrupted and halted as mentioned above, are set on the ADF 8a so that the scanner unit 8 may read the thus set page information.

The system controller 6 also acts as transmission means together with the DCR 1 and CCU 10. The system controller 6 thus causes the remaining pages of the relevant image information thus set on the ADF 8a to be sent in the immediate transmission mode subsequently to the image information in the relevant image information file which was already sent before the relevant interruption occurred.

Figure 15:
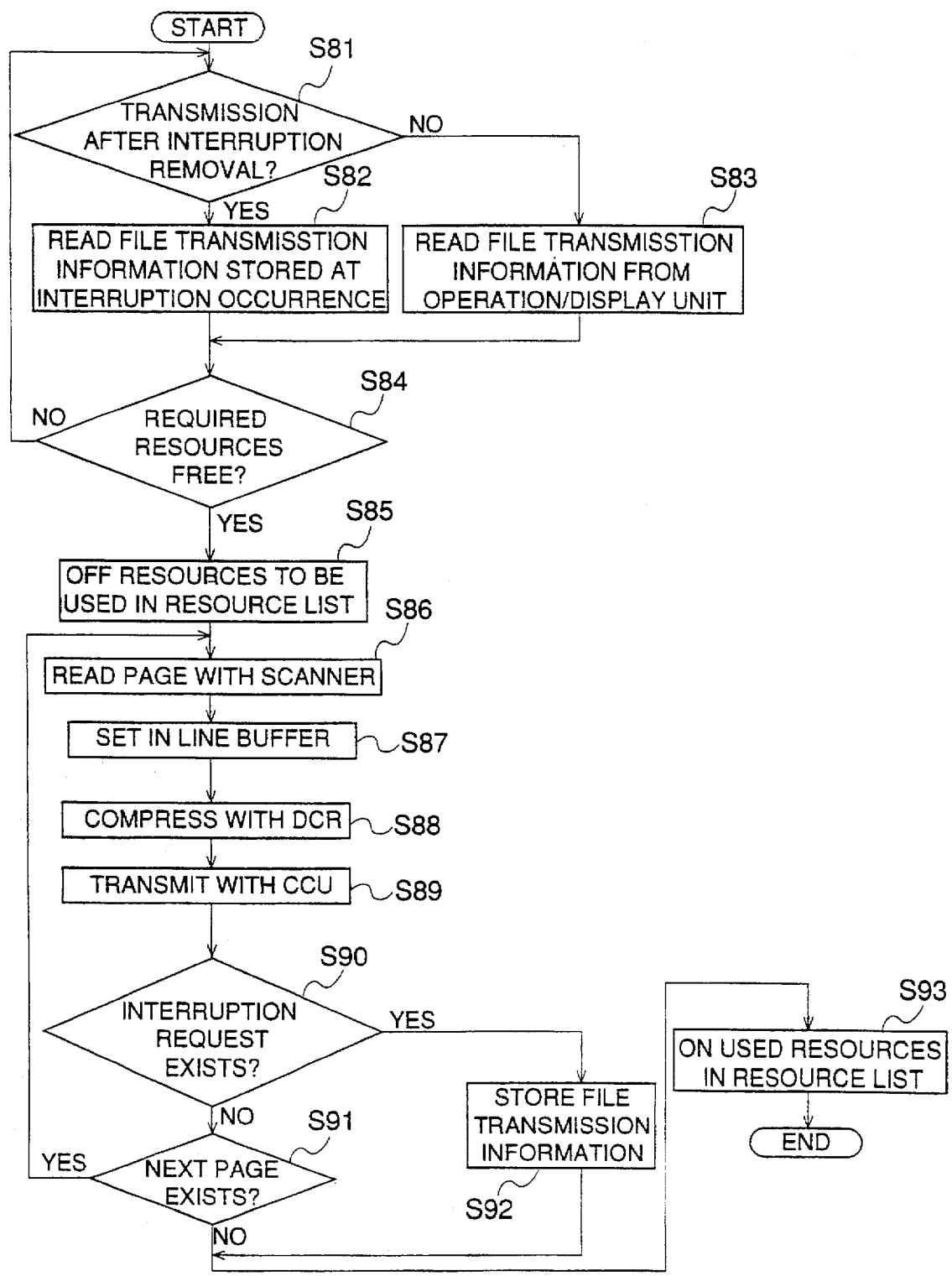
FIG. 15 shows an operation flow in the apparatus shown in FIG. 1 in the ninth embodiment.

The relevant operation is described with reference to FIG. 15 and the processing shown in FIG. 15 is executed by the system controller 6.

In S92, file transmission information relevant to an image information file, immediate transmission mode facsimile transmission of which file has been interrupted and halted, is stored in the system memory 3. The file transmission information comprises the remote facsimile apparatus telephone number, the number of already transmitted pages and so forth.

If interruption is made during performance of the immediate transmission mode facsimile transmission, the interruption is specified through the operation/display unit 4. Thus, the relevant facsimile transmission is halted after the currently transmitted page has been completely transmitted. The file transmission information associated with the relevant file, the facsimile transmission of which has been thus interrupted and halted, is stored in the system memory 3. The system memory 3 manages the stored file transmission information.

In S81, it is determined whether or not facsimile transmission to be currently made comprises a transmission made after the interruption which halted the relevant transmission has been removed. If the relevant transmission does not comprise such a transmission after interruption removal, transmission information specified through the operation/display unit 4 is read in S83. Such transmission information concerns the relevant transmission operation. If however the relevant transmission comprises such an after-interruption-removal transmission, the relevant file transmission information such as mentioned above is read from the system memory 3 in S82. The file transmission information comprises the remote facsimile apparatus telephone number, the number of already transmitted pages and so forth and was stored in the system memory at the time of the interruption occurrence.

Subsequently, it is determined in S84 whether or not the resources required for the immediate transmission mode facsimile transmission are free. The relevant required resources comprise, as shown in FIG. 4, the scanner unit 8, DCR 1 and CCU 10. The determination is made by referring to the resource list shown in FIG. 2 and it is determined whether or not the required resources which have been stored in the system memory 3 are free or busy, that is, whether or not the corresponding bits are '1' or '0'.

If the required resources are free, that is, if the bits for the corresponding resources, the scanner unit 8, DCR 1 and CCU 10 are '1', '0' (OFF) is made to be set therein, in S85, thus indicating that the bits corresponding to the resources are currently used. Then, a page set on the ADF 8a is read by means of the scanner unit 8 in S86. Then, the thus read image information is set in the line buffer memory 7 in S87, compressed through the DCR 1 and transmitted through the CCU 10 in S89.

Subsequently, it is determined in S90 whether or not an interruption request has been specified through the operation/display unit 4. If no interruption request has been specified, it is determined in S91 whether or not a subsequent page to be transmitted exists. If no subsequent page exists, the bits corresponding to the thus used resources are made to be '1' (ON) in S93 so that the current immediate transmission mode facsimile transmission operation may be continued with the relevant resources so as to be completed. Then, the current operation cycle finishes.

If an interruption request has been specified as determined in S90, the currently performed immediate transmission mode facsimile transmission is halted and file transmission information such as described above relevant to the file which has been transmitted via facsimile in the immediate transmission mode and has been then halted due to the interruption is stored in the system memory 3 in S92. Then, after the transmission of the currently transmitted page has been normally completed, the bits corresponding to the thus used resources are made to be '1' (ON) in S93 and then the current operation cycle finishes.

Thus, the immediate transmission mode facsimile transmission is started for a file, which was once being transmitted and the transmission was halted due to the interruption on the way, by using the file transmission information relevant to the relevant file. Thus, when the file is started to be transmitted after the completion of the operation, such as a document duplication operation, started due to the interruption, the operator's redialing of the remote facsimile telephone number is not needed because of the stored file transmission information indicating the relevant facsimile telephone number. Further, a problematic situation may be eliminated in which another call results in 'page 1' being printed in the above-described TTI so that the receiver cannot determine whether or not this new transmission continues from the previously halted document transmission. As a result, a mode change between the immediate transmission mode and the interruption mode may be smoothly made and operation efficiency in the immediate transmission mode facsimile transmission may be improved.

The composite facsimile apparatus in the tenth embodiment of the present invention is described.

In the composite facsimile apparatus in the tenth embodiment, the system controller 6 stores, in the system memory 3 acting as storing means, file storing information relevant to an image information file, which was being stored in the SAF 2 for the purpose of presently transmitting it via facsimile and the storing has been interrupted and halted. The system controller 6 acts as duplication output starting means for causing the scanner unit 8 to start a reading operation associated with a document duplication operation. This reading operation start is made when it is determined that the scanner unit 8 becomes free from carrying out of another operation. The system controller 6 also acts as duplication completion monitoring means for detecting whether or not a duplication operation is completed. The system controller 6 also acts as reading means for reading the file storing information stored in the system memory as mentioned above. This reading is made when the relevant interruption state is removed and the remaining pages of the file, the storing of which file was interrupted and halted as mentioned above, are set on the ADF 8a so that the scanner unit 8 may read the thus set page information. The system controller 6 then stores, in the SAF 2, the remaining pages of the relevant image information thus set on the ADF 8a, so as to continues from the image information in the relevant image information file which was already stored before the relevant interruption occurred.

Figure 16:
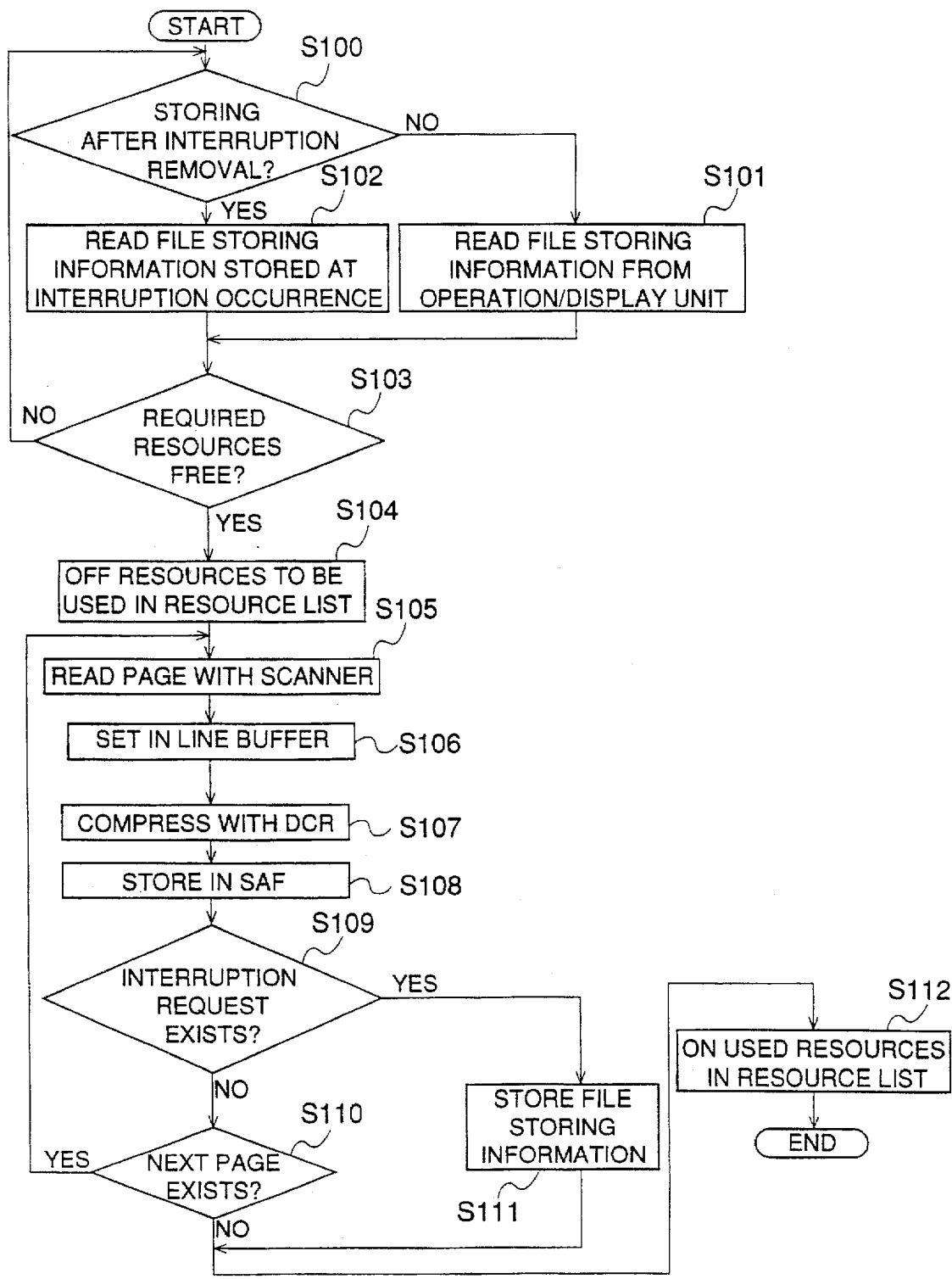
FIG. 16 shows an operation flow in the apparatus shown in FIG. 1 in the tenth embodiment.

The relevant operation is described with reference to FIG. 16 and the processing shown in FIG. 16 is executed by the system controller 6.

In S111, file storing information relevant to an image information file, a storing operation for which file has been interrupted and halted, is stored in the system memory 3. The file storing information comprises the relevant image information address, number of already stored pages, stored line density, image density and so forth.

If interruption is made for the purpose of carrying out of a document duplication operation for example while image information is being stored in the SAF 2, the interruption is specified through the operation/display unit 4. Thus, the relevant SAF 2 image information storing operation is halted. The file storing information relevant to the relevant file, the SAF 2 storing operation for which file has been thus interrupted and halted, is stored in the system memory 3. The system memory 3 manages the stored file storing information.

In S100, it is determined whether or not a SAF 2 storing operation to be currently made comprises a storing operation to be made after the interruption which halted the relevant storing operation has been removed. If the relevant storing operation does not comprise such a storing operation after interruption removal, storing operation information specified through the operation/display unit 4 is read in S101. Such storing operation information concerns a storing operation instruction input by the operator. If the relevant storing operation comprises such after-interruption-removal storing, the relevant file storing information such as mentioned above is read from the system memory 3 in S102. The file storing information comprises the relevant image information address, number of already stored pages, stored line density, image density and so forth and was stored in the system memory at the time of the interruption occurrence. In accordance with the thus read file storing information, the image information storing operation for the relevant image information file is performed so that the thus stored page of the image information is subsequent to the last page among the pages already stored before the relevant interruption occurrence.

Subsequently, it is determined in S104 whether or not the resources required for memory transmission mode facsimile transmission (in which mode, image information file is stored in the SAF 2, then is read and transmitted via facsimile) are free. The relevant required resources comprise the scanner unit 8 and DCR 1. The determination is made by referring to the resource list shown in FIG. 2 and it is determined whether or not the required resources which have been stored in the system memory 3 are free or busy, that is, whether or not the corresponding bits are '1' or '0'.

If the required resources are free, that is, if the bits corresponding to the scanner unit 8 and DCR 1 are '1', '0' (OFF) is made to be set therein, in S104, thus indicating that the corresponding resources are currently used. Then, a page set on the ADF 8a is made to be read by means of the scanner unit 8 in S105. Then, the thus read image information is set in the line buffer memory 7 in S106, compressed through the DCR 1 and stored in the SAF 2 in S107.

Subsequently, it is determined in S109 whether or not an interruption request has been specified through the operation/display unit 4. If no interruption request has been specified, it is determined in S110 whether or not the subsequent page to be stored exists. If no subsequent page exists, the bits corresponding to the thus used resources are made to be '1' (ON) in S112 so that the thus stored image information file will be transmitted via facsimile with the relevant resources by using the relevant information stored in the system memory 3 as described above. Then, the current operation cycle finishes.

If an interruption request has been specified as determined in S109, the currently performed image information storing operation is caused to be halted and the relevant file storing information such as described above relevant to the file which has been stored and has been then halted due to the interruption is stored in the system memory 3 in S111. There, in order to prevent the already stored pages in the relevant image information file from being transmitted via facsimile, the fact that the relevant image information file is in an incomplete state is stored in the system memory 3.

As a result, if the system controller 6 searches for execution waiting files waiting for the appropriate operations to be performed thereon, the relevant file in the incomplete state is removed from the objects to be searched for. Thus, the incomplete file is prevented from being transmitted as it is.

Subsequently, the page, of the relevant image information file, which has been being read through the scanner unit 8 before the relevant interruption has occurred, is normally stored in the SAF 2. Then, the bits corresponding to the thus used resources are made to be '1' (ON) in S112 so that another operation may use the relevant resources and then the current operation cycle finishes.

Thus, the image information storing operation is started for a file, which was once being stored and the storing was halted on the way due to the interruption, by using the file storing information relevant to the relevant file. Thus, when the file storing is restarted after the completion of the operation such as a document duplication operation started due to the interruption, a mode change between the image information storing operation mode and the interruption mode may be smoothly made and operation efficiency in the memory transmission mode facsimile transmission may be improved.

The composite facsimile apparatus in any of eleventh-fourteenth embodiments of the present invention is described with reference to FIG. 17.

Figure 17:
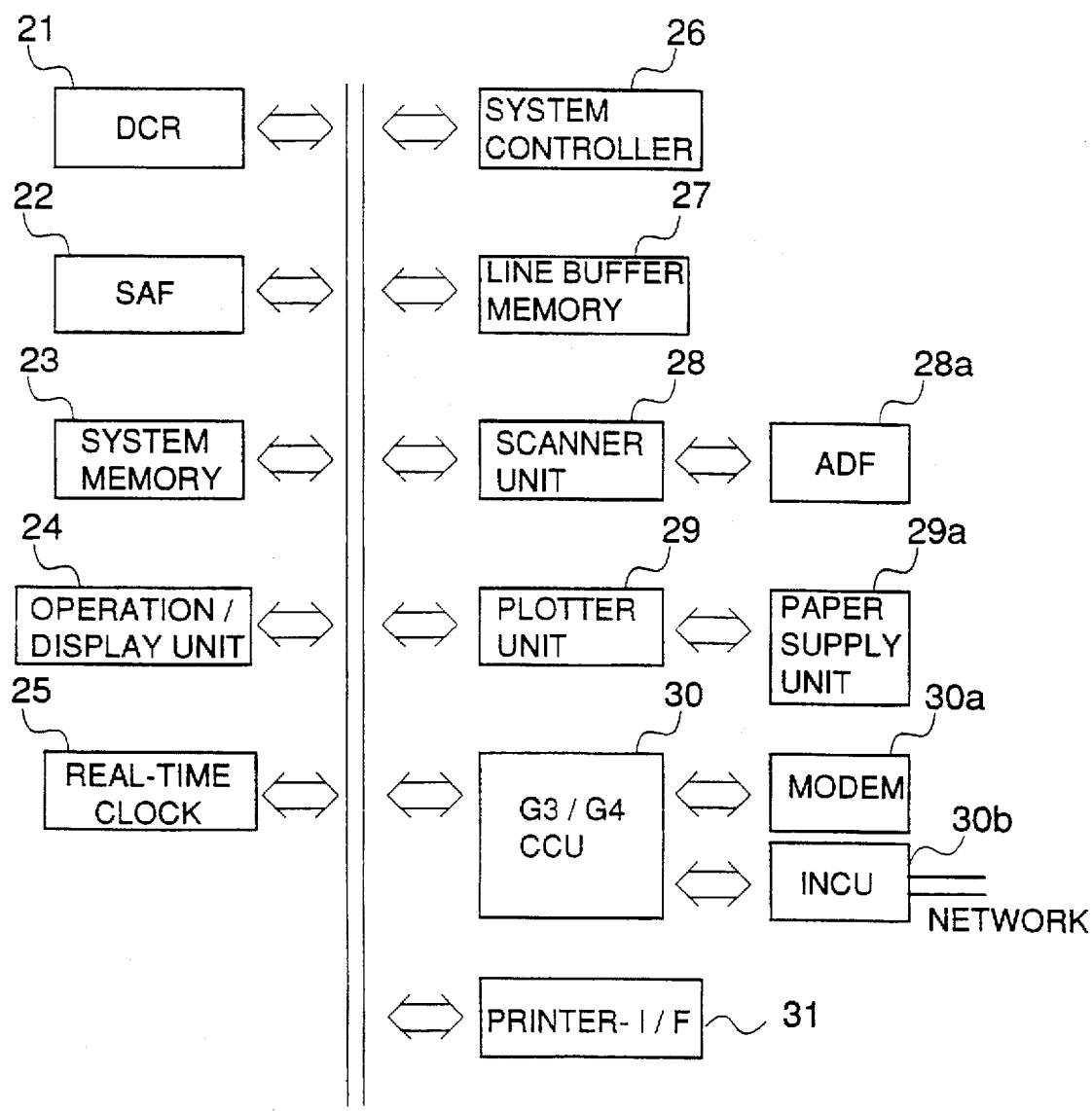
FIG. 17 shows a block diagram of a composite facsimile apparatus in any of eleventh-fourteenth embodiments of the present invention.

In FIG. 17, the composite facsimile apparatus comprises: DCR (image information compressing/reproducing unit) 21; SAF (image information storing memory) 22; system memory 23 for storing system managing data; operation/display unit 24 having a key input unit comprising various switches and a liquid crystal display unit for displaying to the operator the system status in the apparatus; real-time clock 25 providing the clock function; system controller 26 for controlling the entirety of the system in the apparatus; line buffer memory 27 acting as a data transfer memory; scanner unit 28 for reading a document to be transmitted and document to be duplicated; ADF (automatic document feeding unit) 28a provided with a document width sensor; plotter unit 29 for printing a document on a recording paper sheet; paper supplying unit 29a for placing a recording paper sheet at a predetermined position; CCU (communication control unit) 30; MODEM (modulating/demodulating unit) 30a; iNCU (ISDN control unit) 30b; and printer interface (may be simply referred to as printer I/F) 31 for controlling printing of data provided by a host computer such as a personal computer.

This composite facsimile apparatus shown in FIG. 17 has a facsimile function which includes the following modes:

A memory transmission/receiving mode in which to-be-transmitted/received image information is, before it is transmitted through the CCU 30 and iNCU 30b/printed through the plotter unit 29, stored in the SAF 22 and saved therein at least until the transmission/receiving finishes;

an immediate printing receiving mode in which during receiving of image information from a remote facsimile apparatus, the relevant image information is printed through the plotter unit 29; and an immediate transmission mode in which during reading of image information through the scanner unit 28, the relevant image information is transmitted. In addition, the composite facsimile apparatus has a document duplication function of reading document image information through the scanner unit 28 and printing the thus read image information through the plotter unit 29. The composite facsimile apparatus also has a printer function of printing image information input by a device such as a personal computer via the printer I/F 31.

The composite facsimile apparatus in the eleventh embodiment of the present invention is described.

The system controller 26 acts as execution inhibition setting means for inhibiting usage of the resources such as the plotter unit, printer I/F and so forth appropriately so as to inhibit at least one function among the memory transmission/receiving functions, immediate transmission/printing receiving functions, document duplication function and printer function. The system controller 26 also acts as a monitor means for monitoring states of the resources according to specifications made by the operator through the operation/display unit 24 if any. The system controller 26 also acts as determining means for determining whether or not the above state-monitored relevant resources are in states in which the resources are inhibited from being used. The system controller 26 also acts as means for reading the settings that specify which resources are in states in which the resources are inhibited from being used.

Figure 18:
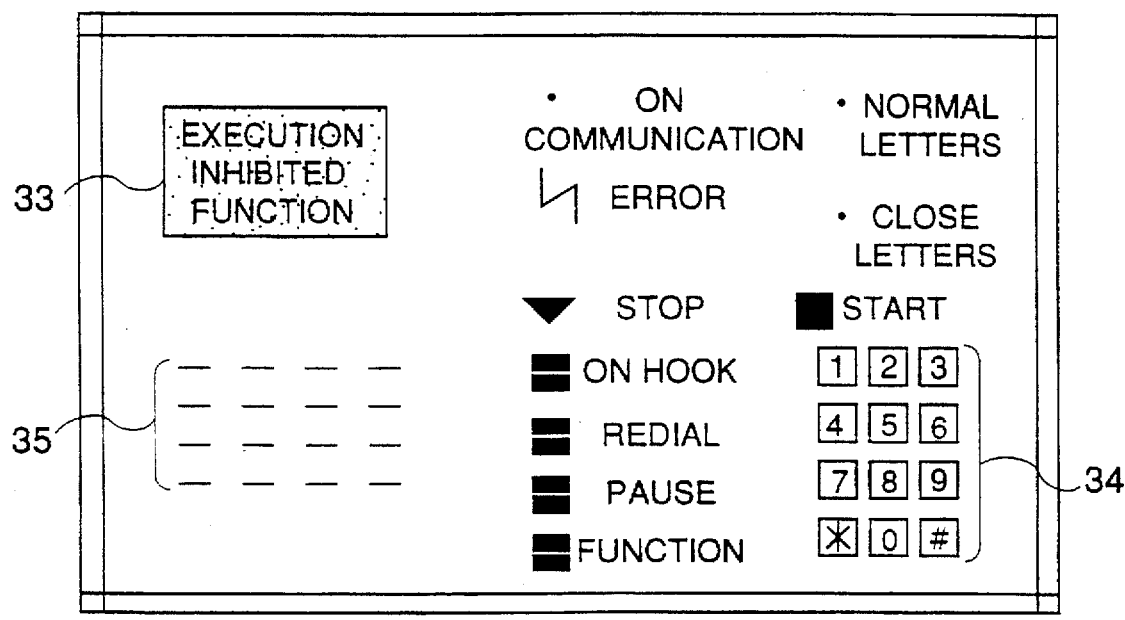
FIG. 18 shows an operation/display unit construction in the apparatus shown in FIG. 17.

The operation/display unit 24 acts as display means for displaying, in accordance with the relevant signal provided from the system controller 26, the above inhibition settings thus read by means of the system controller 26. The unit 24 has the liquid crystal display unit 33, as shown in FIG. 18, and displays various information in accordance with the relevant signals provided by the system controller 26. The operation/display unit 24 has a plurality of operation keys such as a 10-key keypad 34, one-touch key 35, a start key and so forth.

Figure 19:
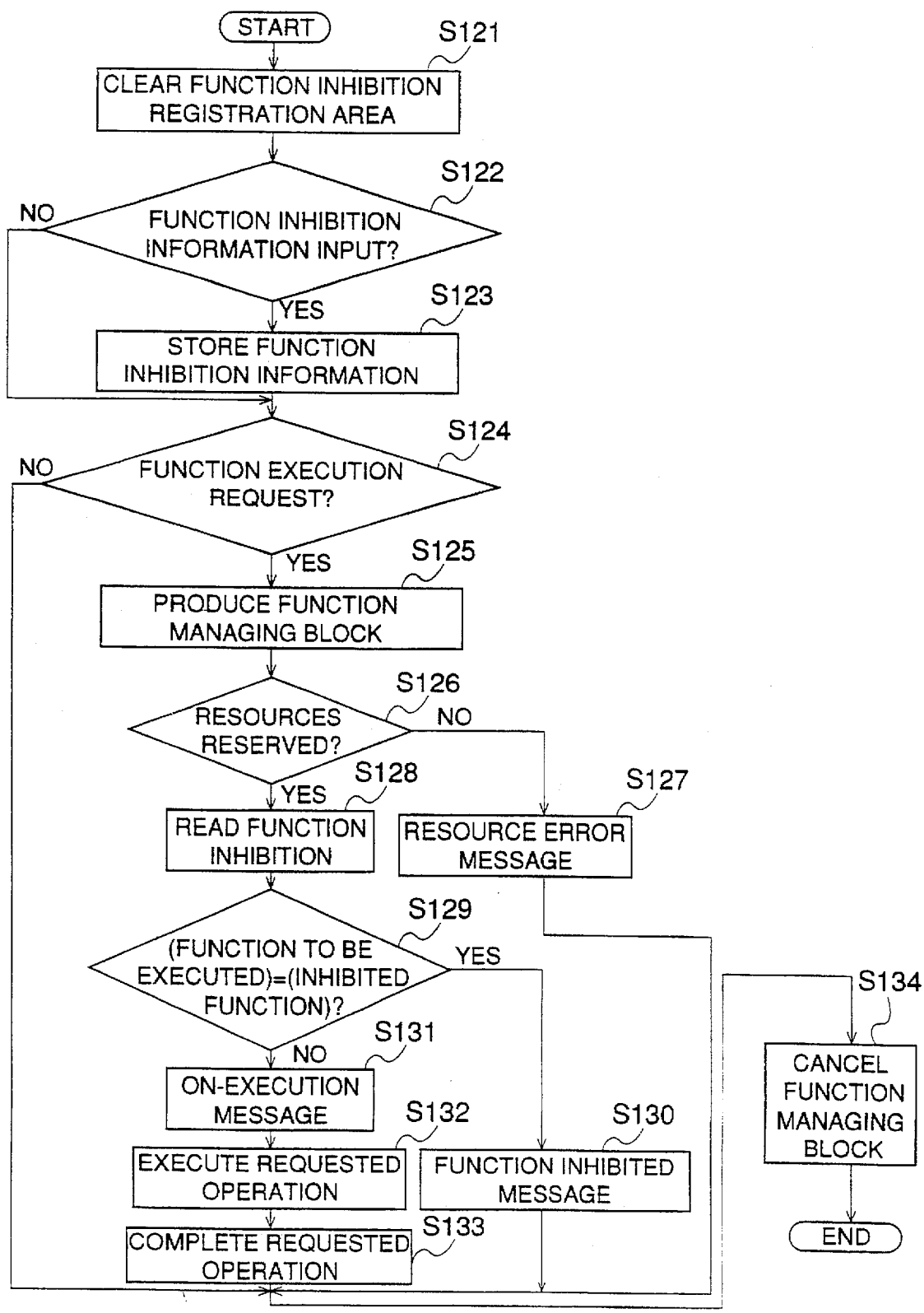
FIG. 19 shows an operation flow in the apparatus shown in FIG. 17 in the eleventh embodiment.

With reference to FIGS. 19–22, the relevant operation is described. The processing shown in FIG. 19 is executed by the system controller 26. In S121, an inhibition function registration area is cleared. In S122, it is determined whether or not the operator inputs, through the operation/display unit 24, information concerning execution-inhibited functions.

Hereinafter, a term 'function (to be inhibited or allowed to be executed)' means a function which has to be performed on a particular image information file(s). Thus, 'a certain function is inhibited or allowed to be executed' can be said by another way such as that 'a particular image information file(s) which is(are) to have a certain function performed thereon, is(are) inhibited or allowed to be processed so as to have performed the certain function thereon', for example. 'A certain function is managed' can be said by another way such as that 'a particular image information file(s) which is(are) to have a certain function performed thereon, is(are) managed as to whether or not a particular image information file(s)' is processed so as to have performed a certain function thereon, for example. Thus, 'a function number(to be used in such function management)' can be said by another way such as 'a image information file number (indicating a particular image information file which is to have a relevant function performed thereon)'. Thus, 'a function type (also to be used in such function management)' can be said by another way such as 'a image information file type (indicating a image information file type which is to have a function in a relevant type performed thereon)'.

If the operator intends, for an, to use the composite facsimile apparatus as a simple printer having only the above-mentioned printer function and any other specified functions using the plotter unit 29 are to be inhibited from being executed for this purpose, the operator should specify the document duplication, memory stored data printing, and managing report printing functions as the execution inhibited functions.

Figure 20:
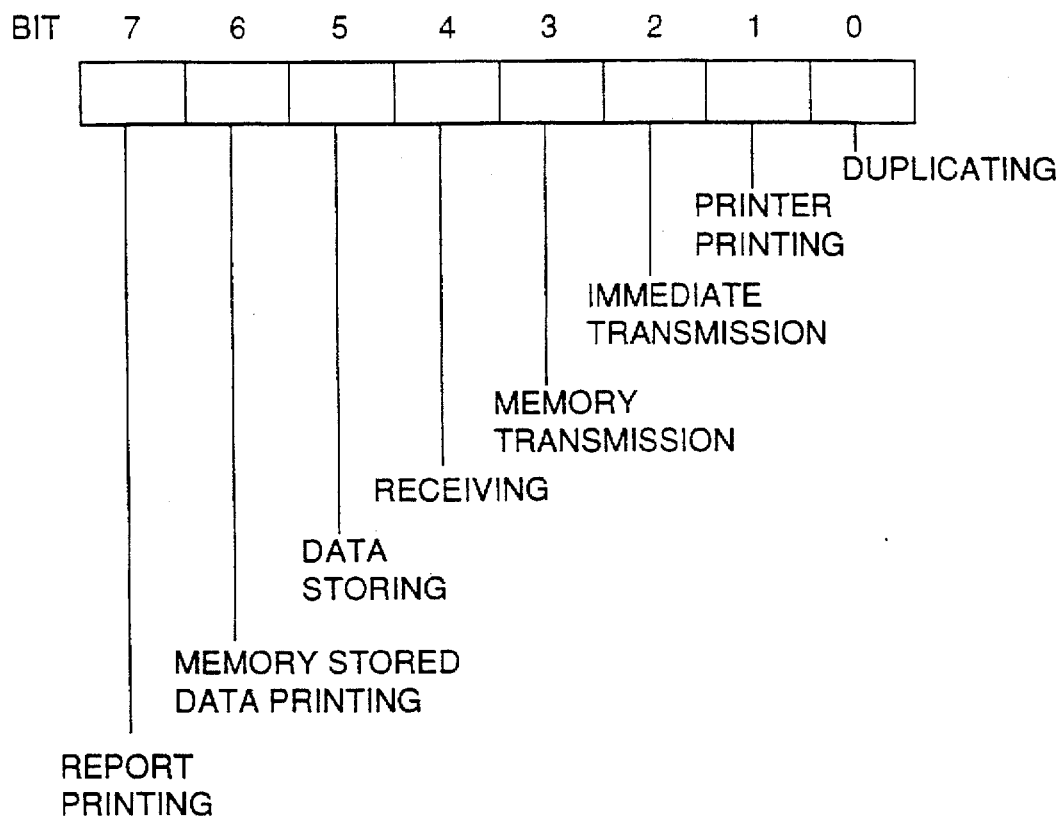
FIG. 20 shows a resource list used in the operation shown in FIG. 19.

If it is determined in S122 that such execution-inhibited function information has been input, the relevant information is stored in the system memory 23 in S123. The method of this system memory 23 storing may comprise a method in which the storing is carried out for each execution inhibited function or may comprise a method in which one bit is prepared for each function and '1' (ON) or '0' (OFF) of the bit respectively indicates that the corresponding function execution is inhibited or allowed. The composite facsimile apparatus in the eleventh embodiment of the present invention applies the latter method. The relevant bit map is shown in FIG. 20.

In the above example, the bits corresponding to the document duplication, memory stored data printing and managing report printing functions are made '1' (ON) and the resulting bit state information is stored in the system memory 23.

Subsequently, under the condition where the execution inhibited functions have been thus registered, it is determined in S124 whether or not the composite facsimile apparatus receives a function execution request. If a function execution request is received, a relevant function managing block is produced in S125. In one example, if a document duplication operation is specified under the above condition, the relevant function managing block is produced for this document duplication operation request and the resulting block is registered in the system memory 23.

Figure 21:
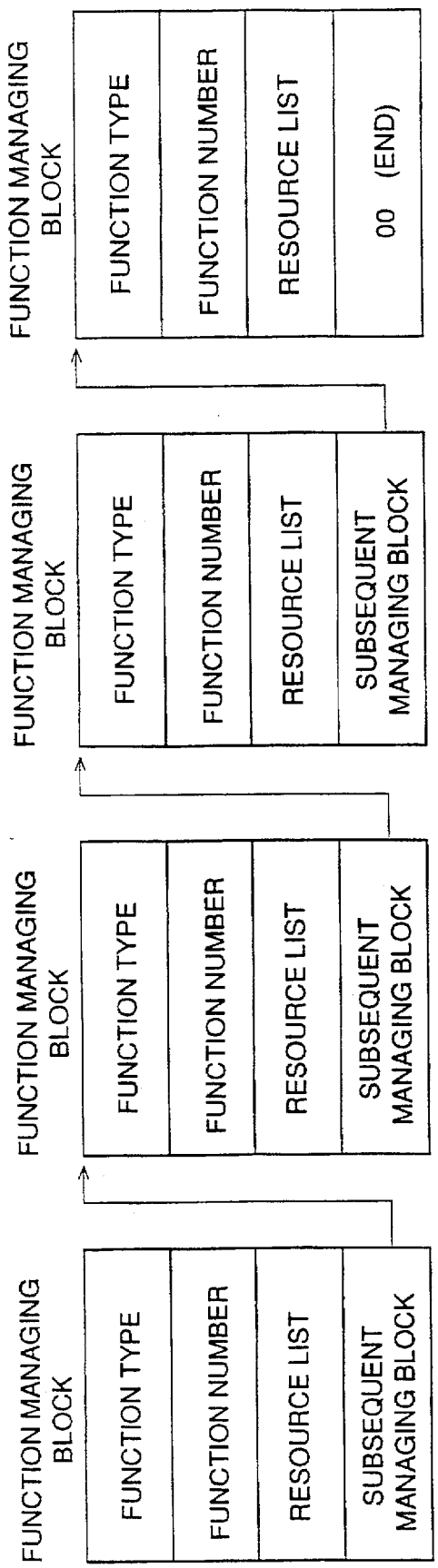
FIG. 21 shows function managing blocks used in the operation shown in FIG. 19.

Such a managing block, as shown in FIG. 21, consists of a function type section for indicating a function type; a function number section for indicating a function number sequentially assigned for each thus produced managing block; a resource list section for indicating resources required for executing the relevant function; and a link section for indicating a managing block concerning a function to be executed subsequently.

In the relevant managing block in this example concerning the document duplication function as mentioned above, identification information '03' as shown in FIG. 22 indicating the document duplication function is written in the function type section; the arbitrary number is written in the function number section; information indicating the scanner unit 28 and plotter unit 29 is written in the resource list section; and '00' is written in the link (subsequent managing block) section because no function is required to be executed subsequently in this case.

Thus, after the start key is pressed, the above function managing block information is stored in the system memory 23.

Subsequently, after the function managing block has been thus registered, it is checked whether or not the thus registered function is in the execution allowed state. If a plurality of functions have been registered, these functions are respectively sequentially similarly checked in S126 in accordance with the order specified by the link sections in the managing blocks. This checking operation comprises checking whether the resources written in the resource list section of the managing block are free and also are in the usable states. In this example concerning the document duplication function, it is checked whether or not the scanner unit 28 and plotter unit 29 are in the usable states.

If the of S126 comprises that the relevant resources are not in the usage allowed states, this fact 'resources cannot be reserved' is displayed on the liquid crystal display unit 33 in S127 and the function managing block relevant to the document duplication function is canceled.

On the other hand, if the result of S126 comprises that the relevant resources are in the usage allowed states, the previously registered execution-inhibited function list bit map is read from the system memory 23 in S128 and the thus read contents are compared with the function types in the currently produced function managing blocks in S129.

In this example, since the document duplication function currently intended to be carried out is registered as an execution-inhibited function, the liquid crystal display unit 33 displays, as shown in FIG. 18, 'execution inhibited function' and the currently produced relevant managing block is canceled.

On the other hand, if the result of S129 is NO, the operation flow starting at S131 is then executed as will be described.

In another example in which the immediate transmission function is intended to be carried out, the relevant destination information is specified through the operation/display unit 24, the relevant document pages to be transmitted are set on the ADF 28a, and the start key is pressed. Thus, it is determined in S124 that the immediate transmission function is requested and the relevant function managing block is produced in S125.

In the relevant managing block, identification information '04' as shown in FIG. 22 indicating the immediate transmission function is written in the function type section; an arbitrary number is written in the function number section; information indicating the scanner unit 28 and a communication line is written in the resource list section; and '00' is written in the link (subsequent managing block) section because no function is required to be executed subsequently in this case. Thus, after the above function managing block information is stored in the system memory 23, it is checked whether or not the thus registered function is in the usable state as described above in S126. In this example concerning the immediate transmission function, it is checked whether or not the scanner unit 28 and communication line are in the usable states.

If the result of S126 comprises that the relevant resources are not in the usable states, this fact 'resources cannot be reserved' is displayed on the liquid crystal display unit 33 in S127 and the function managing block relevant to the immediate transmission function is canceled.

On the other hand, if the result of S126 comprises that the relevant resources are in the usage allowed states, the previously registered execution inhibited function list bit map is read from the system memory 23 in S128 and the thus read contents are compared with the function types in the currently produced function managing blocks in S129.

In this example, since the immediate transmission function currently intended to be carried out is not registered as the execution-inhibited function, the liquid crystal display unit 33 displays 'on execution' (indicating that the relevant process is being executed) in S131. Then, the relevant immediate transmission function is executed in S132. Then, after the relevant transmission-operation is thus completed in S133, the relevant immediate transmission function managing block is canceled.

Another example in which the printer printing (output) function (which is the above mentioned printer function) is intended to be carried out under the above-described condition where the execution-inhibited functions have been registered is described.

The relevant printer printing request is provided through the printer I/F 31. If it is provided, the system controller 26 starts monitoring the relevant input in S124. In S125, the relevant function managing block is produced. In the relevant managing block, identification information '08' as shown in FIG. 22 indicating the immediate transmission function is written in the function type section; an arbitrary number is written in the function number section; information indicating the plotter unit 29 is written in the resource list section; and '00' is written in the link (subsequent managing block) section because no function is required to be executed subsequently in this case.

Thus, after the above function managing block information is stored in the system memory 23, it is checked whether or not the thus registered function is in the execution-allowed state as described above in S126. This checking operation comprises checking whether the resources written in the resource list section of the managing block are unused and also are in the usable states as mentioned above. In this example concerning the printer printing function, it is checked whether or not the plotter unit 29 is unused and also is in the usable state.

If the result of S126 comprises that the relevant resource is not in the usable states, this fact 'resources cannot be reserved' is displayed on the liquid crystal display unit 33 in S127 and the function managing block relevant to the printer printing function is canceled.

On the other hand, the result of S126 comprises that the relevant resources are in the usable state, the previously registered execution-inhibited function list bit map is read from the system memory 23 in S128 and the thus read contents are compared with the function types in the currently produced function managing blocks in S129.

In this example, since the printer printing function currently intended to be carried out is not registered as the execution-inhibited function, the liquid crystal display unit 33 displays 'on execution' in S131. Then, the relevant printer printing function is executed in S132. Then, after the relevant printer printing operation is thus completed in S133, the relevant printer printing function managing block is canceled.

Thus, the usage of the resources of the plotter unit, printer I/F and so forth is inhibited appropriately so as to inhibit at least one function among the memory transmission/receiving functions, immediate transmission/printing receiving functions, document duplication function and printer function. Such resource usage inhibiting creates availability of the relevant resources for a desired function having priority. Thus, the normal of the composite facsimile apparatus is intentionally limited so that the relevant apparatus may be used as a specific simple function device. As a result, the operator is not required to wait for the completion of another operation and the convenience of usage is thus improved in the composite facsimile apparatus.

Further, information concerning registered execution-inhibited functions such as described above is displayed on the liquid crystal display unit 33. Thus, the operator may easily recognize the relevant execution-inhibition information and a problematic situation may be prevented in which the operator cannot determine the reason why the specified function cannot be executed, even though the relevant function is registered as the execution-inhibited function.

The composite facsimile apparatus in the twelfth embodiment of the present invention is described.

In the apparatus in the twelfth embodiment, the system controller 26 acts as:

input monitor means for monitoring input of functions identical to previously set execution-inhibited functions;

execution/completion monitor means for monitoring that an execution-allowed function is executed and the execution is completed; and canceling means for canceling registration of the previously set execution-inhibited functions after the execution of the execution-allowed function is completed.

Figure 23:
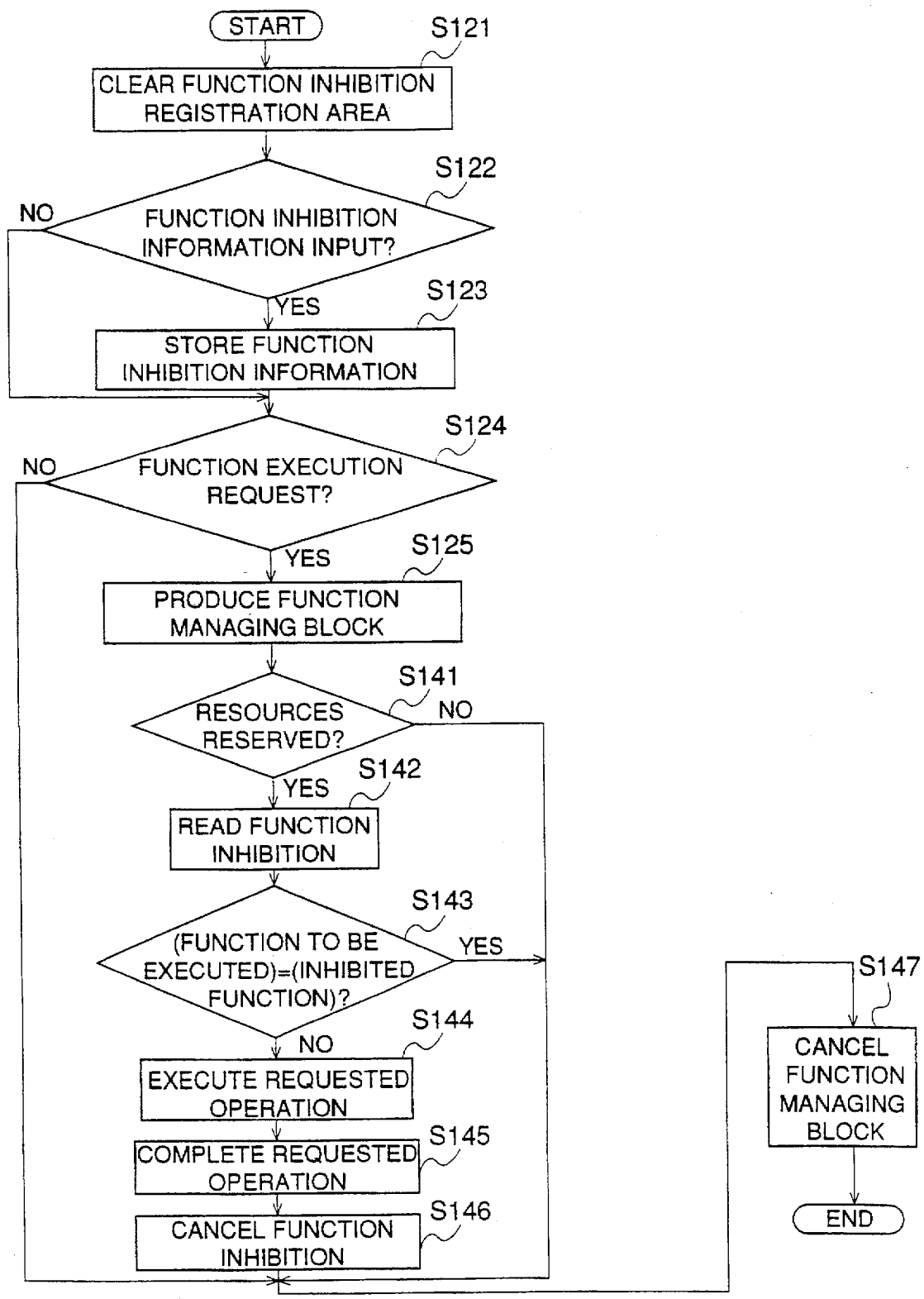
FIG. 23 shows an operation flow example in the apparatus shown in FIG. 17 in the twelfth embodiment.

The relevant operation is described with reference to FIG. 23 and the processing shown in FIG. 23 is executed by the system controller 26. In the operation flow shown in FIG. 23, the steps S121–S125 are respectively similar to those in FIG. 19, the relevant description being thus omitted. In this embodiment, the operator uses the composite facsimile apparatus as a simple printer having only the printer function as described above. An example in which all the functions using the plotter unit 29 are inhibited from being executed is described. There, the duplication, memory stored data printing, and report printing functions are inhibited from being executed by storing '1' (ON) value in the relevant bits in the system memory 23. A case where, under the above execution inhibition condition, the printer printing function is intended to be executed is described.

In this case, the relevant printer printing request is provided through the printer I/F 31. If it is provided, the system controller 26 starts monitoring the relevant input. The relevant function managing block is produced and the resulting function managing block information is stored in the system memory 23 as described above. Then, it is checked whether or not the thus registered function is in the execution allowed state. This checking operation comprises checking whether the resources written in the resource list section of the managing block are unused and also are in the usable state in S141. In this example concerning the printer printing function, it is checked whether or not the plotter unit 29 is in the usable state.

If the result of S141 comprises that the relevant resource is not in the usage allowed states, the function managing block relevant to the printer printing function is canceled. On the other hand, if the result of S141 comprises that the relevant resources are in the usable state, the previously registered execution-inhibited function list bit map is read from the system memory 23 in S142 and the thus read contents are compared with the function types in the currently produced function managing blocks in S143.

In this example, since the printer printing function currently intended to be carried out is not registered as in execution-inhibited function, the relevant printer printing function is executed in S144. Then, after the relevant printer printing operation is thus completed in S145, the previously set execution-inhibited function registration is canceled.

That is, all the bits previously set Ill (ON), (that is, the relevant functions are inhibited from being executed) in the execution-inhibited function list bit map are set to '0' (OFF). Then, the resulting bit map information is stored in the system memory in S146. Then, the currently produced printer printing function managing block is canceled.

Thus, once set execution-inhibited function registration is automatically canceled after a function other than the thus inhibited functions has been executed and the execution has been completed. Thus, the operator is not required to pay attention to canceling once set execution inhibited function registrations after the object of the setting is achieved. As a result, a problematic situation may be prevented in which the operator inhibits all the functions other than the printer function which the operator intends to use, and the operator forgets to cancel the inhibition after the intended operation has been performed; and thus an automatic facsimile receiving function cannot be used due the inhibition even if important information should be received via the relevant apparatus. Thus, the convenience of usage may be improved in the composite facsimile apparatus.

The composite facsimile apparatus in the thirteenth embodiment of the present invention is described.

In the composite facsimile apparatus in the thirteenth embodiment, the system controller 26 acts as:

input monitor means for monitoring input of execution-inhibited functions; and execution monitor means for monitoring execution of an execution-allowed function (which is not inhibited from being executed). The composite facsimile apparatus has a real-time clock 25 for measuring, based on instructions provided by the system controller 26, a time period in which no execution-allowed function is executed. The system controller 26 also acts as canceling means for canceling the set execution-inhibited function registration after the time period measured by the real-time clock reaches a predetermined value.

Figure 24:
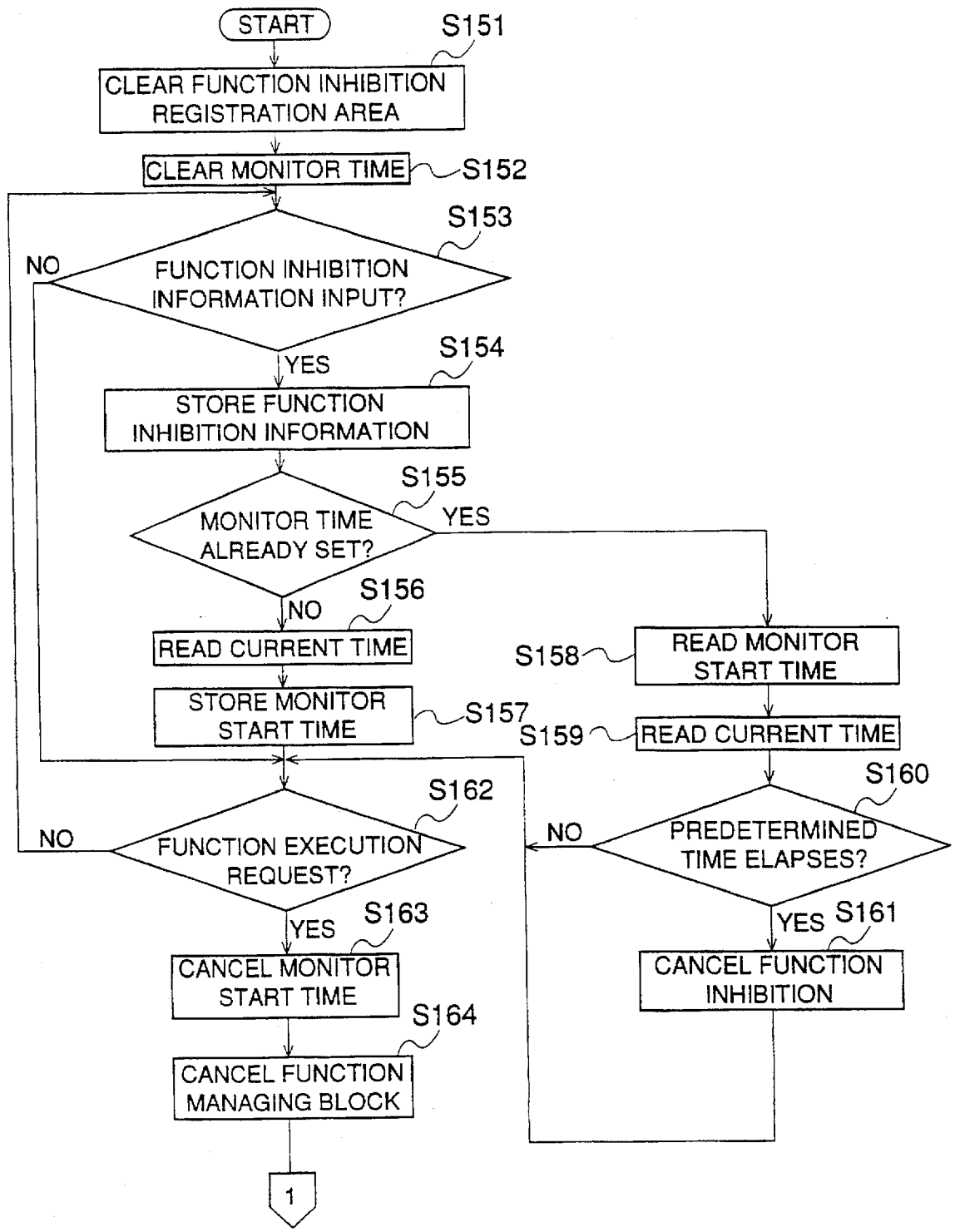
FIGS. 24 and 25 show an operation flow example in the apparatus shown in FIG. 17 in the thirteenth embodiment.
Figure 25:
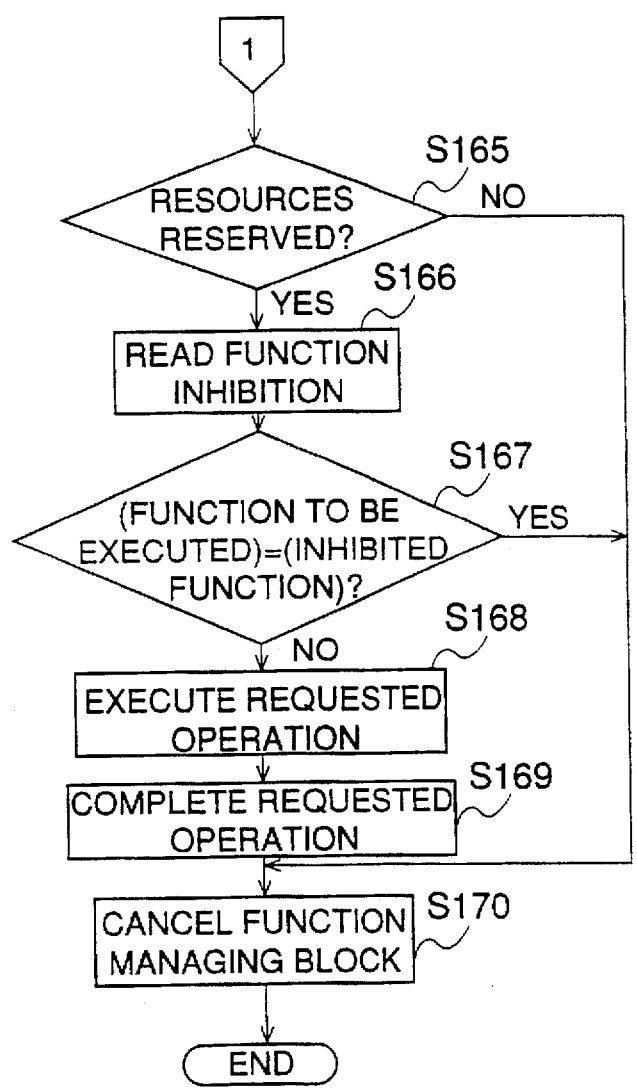

The relevant operation is described with reference to FIGS. 24 and 25 and the processing shown in FIGS. 24 and 25 is executed by the system controller 26.

After an inhibited function registration area is cleared in S151, a monitored time is cleared in S152. Then, in S153, it is determined whether or not execution-inhibited function information has been specified through the operation/display unit 24. In the composite facsimile apparatus in this embodiment, it is periodically (every several milliseconds) monitored by reading the execution-inhibited function list bit map from the system memory 23 whether or not execution-inhibited function information has been specified.

If the operator intends, for example, to use the composite facsimile apparatus as a simple printer having only the above-mentioned printer function and any other specified functions using the plotter unit 29 are inhibited from being executed for this purpose, the operator should input information specifying the document duplication, memory stored data printing, and managing report printing functions as the execution inhibited functions.

If it is determined in S153 that such execution-inhibited function information has been input, the relevant information is stored in the system memory 23 in S154. In this case, the bits corresponding to the document duplication, memory stored data printing and managing report printing functions are set to '1' (ON) and the resulting bit state information is stored in the system memory 23.

Then, it is monitored in S156 whether or not a monitor starting time has been set or not. If it has not been set yet, the current time is read from the clock 25 and the thus read current time is stored in the system memory 23 as the monitor starting time in S157.

If the monitor starting time has been already set as determined in S156, the set monitor starting time is read from the system memory 23 in S158. Subsequently, the current time is read from the clock 25 in S159.

Then, it is determined in S160 whether or not the time elapsed between the monitor starting time and the current time is greater than a predetermined time (five minutes, for example). If it is determined that a function execution request is input in S162 within the above five minutes, the time stored in the system memory 23 is canceled in S163.

If no function execution request is input in S162 for the five minutes as determined in S160, all the bits in the bit map corresponding to the previously set execution inhibited functions are set to '0' (OFF) and the resulting bit information is stored in the system memory 23.

Further, if a function execution request is input within the five minutes, the monitor starting time is canceled as mentioned above and the function managing block relevant to the thus input function execution request is produced in S164. In a case where the relevant function required to be executed comprises the document duplication function, the relevant document duplication function managing block is produced and registered in the system memory 23.

Subsequently, after the function managing block has been thus registered, it is checked whether or not the thus registered function is in the execution allowed state as described above. This checking operation comprises checking whether the resources written in the resource list section of the managing block are unused and also are in the usable states in S165. In this example concerning the document duplication function, it is checked whether or not the scanner unit 28 and plotter unit 29 are in the usage allowed states.

If the result of S165 comprises that the relevant resources are not in the usable states, the function managing block relevant to the document duplication function is canceled.

On the other hand, if the result of S165 comprises that the relevant resources are in the usable states, the previously registered execution-inhibited function list bit map is read from the system memory 23 in S166 and the thus read contents are compared with the function types in the currently produced function managing blocks in S167.

If the currently execution-requested function comprises the document duplicating function, this function is identical to the above execution-inhibited function. Thus, the currently produced relevant document duplication function managing block is canceled in S170.

On the other hand, if the execution-requested function is not identical to the execution inhibited function, the relevant function is executed and the relevant function managing block is canceled in S168–S170.

Further, after an execution-allowed function is executed, if another document duplication function execution request is input within the five minutes, the current time at which the relevant function execution has been completed is read from the clock 25 and is overwritten in the system memory 23. Then, S155–S162 are executed.

Thus, a predetermined time period from the time at which an execution-allowed function is executed is required to elapse for automatic cancellation of the set execution-inhibited function registration. Such a procedure is advantageous to be applied to a case where a plurality of execution-allowed functions are intended to be executed successively. If the method described with reference to FIG. 23 is applied to such a case, the operator is required to perform execution-inhibited function registration every time an execution-allowed function has been executed. However, in the method shown in FIGS. 24 and 25, the plurality of execution-allowed functions may be successively executed without repeated registration as long as the time interval between the execution allowed function execution times is within the above mentioned predetermined time.

The composite facsimile apparatus in the fourteenth embodiment of the present invention is described.

In the apparatus, the system controller 26 acts as:

means for causing inhibiting setting means to perform execution-inhibited function registration such as described above in accordance with a predetermined setting schedule, in response to the arrival of a specific day in the week and of a specific time zone in the day; and means for activating the functions other than the functions execution of which is inhibited due to the execution-inhibited function registration performed by means of the inhibiting setting means.

Figure 26:
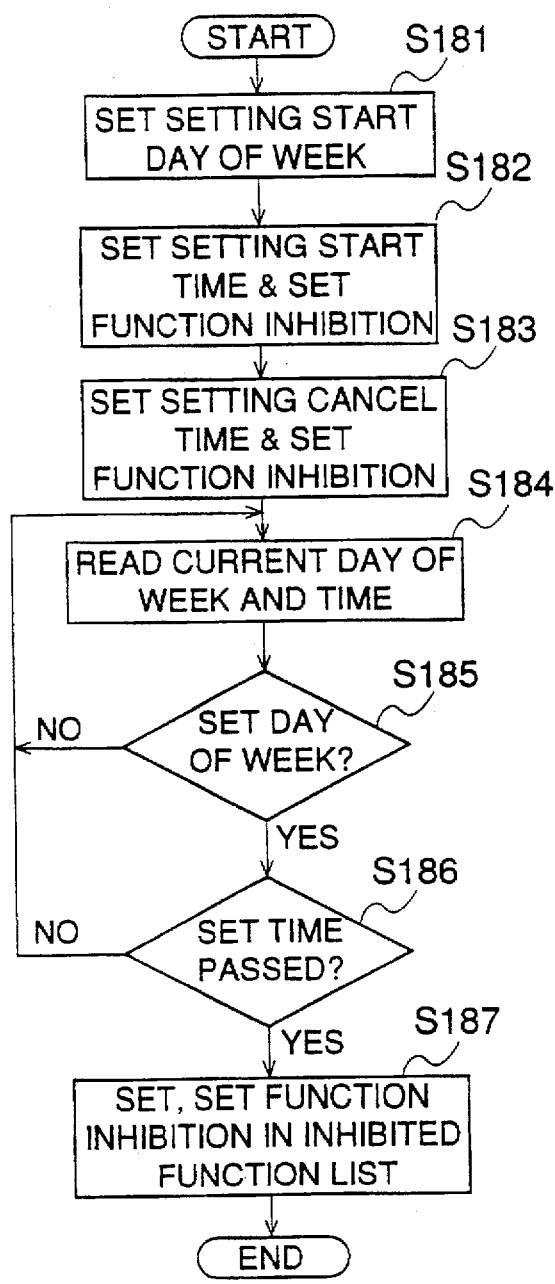
FIG. 26 shows an operation flow example in the apparatus shown in FIG. 17 in the fourteenth embodiment.

The relevant operation is described with reference to FIG. 26 and the processing shown in FIG. 26 is executed by the system controller 26.

If the operator inputs through the operation/display unit 24 a setting starting day of the week, the thus input setting starting day of the week is registered in the system memory 23 in S181. If the operator inputs through the operation/display unit 24 a setting starting time of the day and execution-inhibited function information, the thus input setting starting time of the day and execution-inhibited function information is stored in the system memory 23 in S182.

If the operator inputs through the operation/display unit 24 a setting canceling time of the day and execution-inhibited function information, the thus input setting canceling time in the day and execution-inhibited function information is stored in the system memory 23 in S183.

It is to be assumed that the operator intends to set the apparatus usage allowance schedule so that all the functions are set to the execution-allowed state at the work beginning time on Friday and all the functions other than facsimile receiving function are set to the execution-inhibited state at the work ending time on Friday. In this case, Friday and 8:30 are specified and all the bits in the function list bit map shown in FIG. 20 are turned OFF (indicating execution allowance) in S181 and S182. In S183, 17:30 is specified and all the bits excepting the number 4 bit relevant to the receiving function are turned ON (indicating execution inhibition). The resulting information is stored in the system memory 23.

In S184, the current day of the week and the current time are read from the real-time clock 25. The thus read day of the week is compared with the day of the week previously registered in the system memory 23 in S185. If the thus clock-read day of the week agrees with the system-memory-stored day of the week, the clock-read time is compared with the system-memory-stored times in S186. If the thus clock-read time passes any time of the system-memory-stored times, the system-memory-stored execution-inhibited function information relevant to the elapsed time of the system-memory-stored times is used. Thus, the relevant bit values are written in the above execution-inhibited function list in S186.

Thus, the necessity of repeated manual execution-inhibited function registration may be eliminated if the operator intends to inhibit the composite facsimile apparatus from being used except for the automatic facsimile receiving operation, on every off day and/or during non-work hours every day. Further, such an automatic execution inhibited function registration setting may eliminate all intervention by the manager in managing the usage of the composite facsimile apparatus. It is thus possible to arbitrarily automatically control as to which function may be used in which time zone and/or which day of the week.

Further, the present invention is not limited to the above described embodiments, and variations and modifications may be made without departing from the scope of the present invention.

What is claimed is:

1. A facsimile apparatus comprising:

signal receiving means for receiving an image signal through a facsimile function;

image reading means for reading an image and outputting a corresponding image signal;

outputting means for outputting onto a recording medium any of the image specified by the signal received by said signal receiving means, the image specified by the signal output by said image reading means and an image specified by a host computer;

signal transmitting means for transmitting an image signal through the facsimile function, which signal originates in the data read through said image reading means either directly or the data first read through said image reading means and then stored in storing means;

said storing means for storing data read through said image reading means and data received through said signal receiving means;

and managing means for managing so that the respective means included in said apparatus may be efficiently used in any respective function of a facsimile transmitting operation, a facsimile receiving operation, a duplicating operation and a host-computer printer operation, wherein said managing means inhibits, based on a user setting, the use of all the respective functions except for a desired operation so that said desired operation may be ensured to be carried out.

2. The facsimile apparatus according to claim 1, further comprising indicating means for indicating which functions said managing means inhibits from being used.

3. The facsimile apparatus according to claim 1, wherein said managing means comprises usage and completion monitor means for monitoring how the respective means are being used and whether or not the usage is completed so that the means the usage of which has been completed may be immediately used for another usage by invalidating the relevant inhibition.

4. The facsimile apparatus according to claim 1, wherein said managing means comprises timer means for measuring time for which a certain specified operation has waited to use the relevant means, so that said certain specified operation will be allowed to use said relevant means after a predetermined time elapses.

5. The facsimile apparatus according to claim 1, wherein said managing-means changes modes depending on particular days of the week and/or depending on particular times in the day.

6. A facsimile apparatus comprising:

signal receiving means for receiving an image signal through facsimile transmission;

image reading means for reading an image and outputting a corresponding image signal;

outputting means for outputting onto a recording medium any one of an image specified by the image signal received by said signal receiving means, an image specified by the image signal output by said image reading means, and an image specified by a host computer;

signal transmitting means for transmitting an image signal by facsimile, which image signal originates in the data fed by said image reading means either directly or the data first read by said image reading means and then stored in storing means, said storing means storing data read by said image reading means and data received by said signal receiving means; and managing means for managing so that means included in said facsimile apparatus may be efficiently used in any one respective function of a facsimile transmitting operation, a facsimile receiving operation, a duplicating operation or a host-computer printer operation, wherein said managing means inhibits, based on a user setting, the use of all of the respective functions except for a desired operation so that it may be ensured that said desired operation is carried out.

7. A facsimile apparatus comprising:

signal receiving means for receiving an image signal through facsimile transmission;

image reading means for reading an image and outputting a corresponding image signal;

outputting means for outputting onto a recording medium any one of an image specified by the image signal received by said signal receiving means, an image specified by the image signal output by said image reading means, and an image specified by a host computer;

signal transmitting means for transmitting an image signal by facsimile, which image signal originates in the data fed by said image reading means either directly or the data first read by said image reading means and then stored in storing means, said storing means storing data read by said image reading means and data received by said signal receiving means;

managing means for managing so that means included in said facsimile apparatus may be efficiently used in any one respective function of a facsimile transmitting operation, a facsimile receiving operation, a duplicating operation or a host-computer printer operation, wherein said managing means inhibits, based on a user setting, the use of all of the respective functions except for a desired operation so that it may be ensured that said desired operation is carried out; and indicating means for indicating which functions said managing means inhibits from being used.

8. A facsimile apparatus comprising:

signal receiving means for receiving an image signal through facsimile transmission;

image reading means for reading an image and outputting a corresponding image signal;

outputting means for outputting onto a recording medium any one of an image specified by the image signal received by said signal receiving means, an image specified by the image signal output by said image reading means, and an image specified by a host computer;

signal transmitting means for transmitting an image signal by facsimile, which image signal originates in the data fed by said image reading means either directly or the data first read by said image reading means and then stored in storing means, said storing means storing data read by said image reading means and data received by said signal receiving means; and managing means for managing so that means included in said facsimile apparatus may be efficiently used in any one respective function of a facsimile transmitting operation, a facsimile receiving operation, a duplicating operation or a host-computer printer operation, wherein said managing means inhibits, based on a user setting, the use of all of the respective functions except for a desired operation so that it may be ensured that said desired operation is carried out, wherein said managing means comprises usage and completion monitor means for monitoring how means, included in said facsimile apparatus, are being used and whether or not the usage of the means is completed so that means, the usage of which means has been completed, may be immediately used for another usage by invalidating an inhibition which has inhibited said means from being used for said another usage.

9. A facsimile apparatus comprising:

signal receiving means for receiving an image signal through facsimile transmission;

image reading means for reading an image and outputting a corresponding image signal;

outputting means for outputting onto a recording medium any one of an image specified by the image signal received by said signal receiving means, an image specified by the image signal output by said image reading means, and an image specified by a host computer;

signal transmitting means for transmitting an image signal by facsimile, which image signal originates in the data fed by said image reading means either directly or the data first read by said image reading means and then stored in storing means, said storing means storing data read by said image reading means and data received by said signal receiving means; and managing means for managing so that means included in said facsimile apparatus may be efficiently used in any one respective function of a facsimile transmitting operation, a facsimile receiving operation, a duplicating operation or a host-computer printer operation, wherein said managing means inhibits, based on a user setting, the use of all of the respective functions except for a desired operation so that it may be ensured that said desired operation is carried out, wherein said managing means comprises timer means for measuring an amount of time for which a certain specified operation has waited to use means included in said facsimile apparatus, so that said certain specified operation is allowed to use said means after a predetermined amount of time elapses.

10. A facsimile apparatus comprising:

signal receiving means for receiving an image signal through facsimile transmission;

image reading means for reading an image and outputting a corresponding image signal;

outputting means for outputting onto a recording medium any one of an image specified by the image signal received by said signal receiving means, an image specified by the image signal output by said image reading means, and an image specified by a host computer;

signal transmitting means for transmitting an image signal by facsimile, which image signal originates in the data fed by said image reading means either directly or the data first read by said image reading means and then stored in storing means, said storing means storing data read by said image reading means and data received by said signal receiving means; and managing means for managing so that means included in said facsimile apparatus may be efficiently used in any one respective function of a facsimile transmitting operation, a facsimile receiving operation, a duplicating operation or a host-computer printer operation, wherein said managing means inhibits, based on a user setting, the use of all of the respective functions except for a desired operation so that it may be ensured that said desired operation is carried out, wherein said managing means changes modes depending on at least one of particular days of the week and particular times of day.

* * * * *